United States Patent
Chiu et al.

(10) Patent No.: US 12,423,059 B2
(45) Date of Patent: Sep. 23, 2025

(54) INPUT SEQUENCE RE-ORDERING METHOD AND INPUT SEQUENCE RE-ORDERING UNIT WITH MULTI INPUT-PRECISION RECONFIGURABLE SCHEME AND PIPELINE SCHEME FOR COMPUTING-IN-MEMORY MACRO IN CONVOLUTIONAL NEURAL NETWORK APPLICATION

(71) Applicant: NATIONAL TSING HUA UNIVERSITY, Hsinchu (TW)

(72) Inventors: Yen-Cheng Chiu, Hsinchu (TW); Ta-Wei Liu, Hsinchu (TW); Fu-Chun Chang, Hsinchu (TW); Meng-Fan Chang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 1143 days.

(21) Appl. No.: 17/341,408

(22) Filed: Jun. 8, 2021

(65) Prior Publication Data
US 2022/0391691 A1    Dec. 8, 2022

(51) Int. Cl.
*G06F 7/76*    (2006.01)
*G06F 7/08*    (2006.01)
*G06F 7/544*    (2006.01)

(52) U.S. Cl.
CPC .................. *G06F 7/76* (2013.01); *G06F 7/08* (2013.01); *G06F 7/5443* (2013.01)

(58) Field of Classification Search
CPC . G06F 7/06; G06F 7/08; G06F 7/5443; G06F 7/76–785; G06F 17/16; G06F 7/0464; G06F 7/063; G06F 7/065
See application file for complete search history.

(56) References Cited

U.S. PATENT DOCUMENTS

2020/0133637 A1\*   4/2020   Rose .......................... G06F 7/06
2020/0320384 A1\*   10/2020   Larzul ....................... G06N 3/04
(Continued)

OTHER PUBLICATIONS

Win-S. Khwa et al., "A 40-nm, 2M-Cell, 8b-Precision, Hybrid SLC-MLC PCM Computing-in-Memory Macro with 20.5-65.0TOPS/W for Tiny-AI Edge Devices," 2022 (ISSCC), San Francisco, CA, USA, 2022, pp. 1-3, doi: 10.1109/ISSCC42614.2022.9731670. (Year: 2022).\*
(Continued)

Primary Examiner — Carlo Waje
(74) Attorney, Agent, or Firm — CKC & Partners Co., LLC

(57) ABSTRACT

An input sequence re-ordering method with a multi input-precision reconfigurable scheme and a pipeline scheme for a computing-in-memory macro in a convolutional neural network application is configured to re-order a plurality of multi-bit input signals and includes performing a scanning step and a re-ordering step. The scanning step includes driving a scanner to scan one group of the multi-bit input signals to determine whether an initial value of a plurality of flag signals in one of a plurality of multi-bit section flags is changed to an inverted initial value according to a plurality of bit numbers of the one group of the multi-bit input signals. The re-ordering step includes driving a sorter to select a part of the one group of the multi-bit input signals corresponding to a plurality of the inverted initial values of the flag signals in the one of the multi-bit section flags.

14 Claims, 24 Drawing Sheets

(56) References Cited

U.S. PATENT DOCUMENTS

2020/0372331 A1* 11/2020 Chang .................... G06N 3/065
2021/0271959 A1* 9/2021 Chettuvetty ........... G06N 3/065

OTHER PUBLICATIONS

G. Yuan et al., "FORMS: Fine-grained Polarized ReRAM-based In-situ Computation for Mixed-signal DNN Accelerator," 2021 (ISCA), Valencia, Spain, 2021, pp. 265-278, doi: 10.1109/ISCA52012.2021.00029. (Year: 2021).*

* cited by examiner

INPUT SEQUENCE RE-ORDERING METHOD AND INPUT SEQUENCE RE-ORDERING UNIT WITH MULTI INPUT-PRECISION RECONFIGURABLE SCHEME AND PIPELINE SCHEME FOR COMPUTING-IN-MEMORY MACRO IN CONVOLUTIONAL NEURAL NETWORK APPLICATION

BACKGROUND

Technical Field

The present disclosure relates to an input sequence re-ordering method and an input sequence re-ordering unit for a computing-in-memory (CIM) macro in a convolutional neural network (CNN) application. More particularly, the present disclosure relates to an input sequence re-ordering method and an input sequence re-ordering unit with a multi input-precision reconfigurable scheme and a pipeline scheme for a CIM macro in a CNN application.

Description of Related Art

Many CIM applications are AI-oriented applications. The memory mainly implements multiply-and-accumulate (MAC) functions to satisfy the neural networks' enormous inner product operations, such as a convolutional layer or a fully connected layer. Therefore, how to effectively handle the MAC functions becomes the biggest problem of this type of applications, especially when processing multi-bit operations. There have been many conventional methods for the inputs in the MAC functions that continuously give low-bit inputs and further accumulate the results of multiple cycles of operations to form a MAC output corresponding to a plurality of multi-bit inputs.

There are two challenges faced by the conventional methods. First, when processing the multi-bit inputs, the operating time will be lengthened, and the power consumption will also grow, which leads to an inefficient processing of high-bit operations. Second, when processing a group of the multi-bit inputs sent to the CIM, bit numbers of the group of the multi-bit inputs must be considered from a general perspective. Although most of the bit numbers of the group of the multi-bit inputs can be represented by low bits, high bits still need to be utilized in operation.

Therefore, an input sequence re-ordering method and an input sequence re-ordering unit with a multi input-precision reconfigurable scheme and a pipeline scheme for a CIM macro in a CNN application having the features of speeding up the total time of the entire operation process and solving the burden of the CIM macro in processing multi-bit operations are commercially desirable.

SUMMARY

According to one aspect of the present disclosure, an input sequence re-ordering method with a multi input-precision reconfigurable scheme and a pipeline scheme for a computing-in-memory (CIM) macro in a convolutional neural network (CNN) application is configured to re-order a plurality of multi-bit input signals and includes performing a scanning step and a re-ordering step. The scanning step includes driving a scanner to scan one group of the multi-bit input signals to determine whether an initial value of one of a plurality of flag signals in one of a plurality of multi-bit section flags is changed to an inverted initial value according to a plurality of bit numbers of the one group of the multi-bit input signals, and the initial value is different from the inverted initial value. The re-ordering step includes driving a sorter to select a part of the one group of the multi-bit input signals corresponding to a plurality of the inverted initial values of the flag signals in the one of the multi-bit section flags, and then transmit the part of the one group of the multi-bit input signals to the CIM macro.

According to another aspect of the present disclosure, an input sequence re-ordering method with a multi input-precision reconfigurable scheme and a pipeline scheme for a CIM macro in a CNN application is configured to re-order a plurality of multi-bit input signals and includes performing a scanning step, a re-ordering step and a pipeline step. The scanning step includes driving a scanner to scan one group of the multi-bit input signals to determine whether an initial value of one of a plurality of flag signals in one of a plurality of multi-bit section flags is changed to an inverted initial value according to a plurality of bit numbers of the one group of the multi-bit input signals, and the initial value is different from the inverted initial value. The re-ordering step includes driving the sorter to select a part of the one group of the multi-bit input signals corresponding to a plurality of the inverted initial values of the flag signals in the one of the multi-bit section flags, and then transmit the part of the one group of the multi-bit input signals to the CIM macro. The pipeline step includes driving the CIM macro to perform a multiply-and-accumulate calculation according to the one of the multi-bit section flags and the part of the one group of the multi-bit input signals, and driving the scanner to scan a next group of the multi-bit input signals, and the CIM macro and the scanner are driven by using the pipeline scheme.

According to further another aspect of the present disclosure, an input sequence re-ordering unit with a multi input-precision reconfigurable scheme and a pipeline scheme for a CIM macro in a CNN application is configured to re-order a plurality of multi-bit input signals and includes a sorter. The sorter is electrically connected to the CIM macro and includes a plurality of multi-bit section flags and a scanner. The multi-bit section flags include a plurality of flag signals. The scanner is electrically connected to the multi-bit section flags. The scanner is configured to scan one group of the multi-bit input signals to determine whether an initial value of one of the flag signals in one of the multi-bit section flags is changed to an inverted initial value according to a plurality of bit numbers of the one group of the multi-bit input signals, and the initial value is different from the inverted initial value. The sorter is configured to select a part of the one group of the multi-bit input signals corresponding to a plurality of the inverted initial values of the flag signals in the one of the multi-bit section flags, and transmit the part of the one group of the multi-bit input signals to the CIM macro.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Before describing any embodiments in detail, some terms used in the following are described. A voltage level of "1" represents that the voltage is equal to a power supply voltage VDD. The voltage level of "0" represents that the voltage is equal to a ground voltage GND. A PMOS transistor and an NMOS transistor represent a P-type MOS transistor and an N-type MOS transistor, respectively. Each transistor has a source, a drain and a gate.

Figure 1:
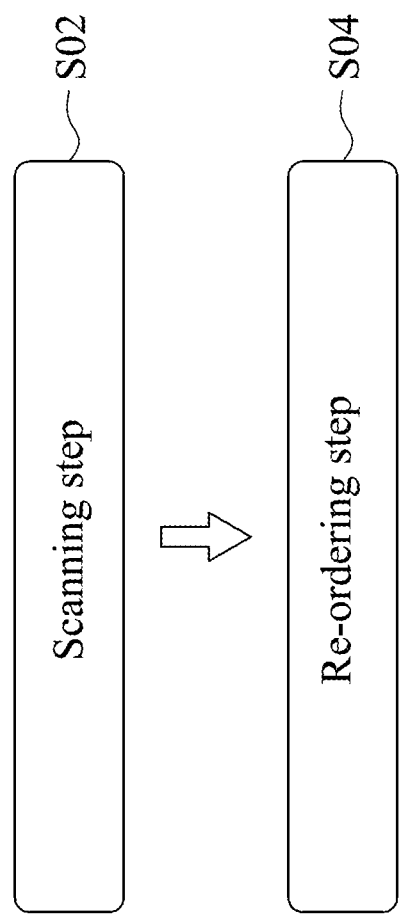
FIG. 1 shows a flow chart of an input sequence re-ordering method with a multi input-precision reconfigurable scheme and a pipeline scheme for a computing-in-memory (CIM) macro in a convolutional neural network (CNN) application according to a first embodiment of the present disclosure.

FIG. 1 shows a flow chart of an input sequence re-ordering method 100 with a multi input-precision reconfigurable scheme and a pipeline scheme for a computing-in-memory (CIM) macro in a convolutional neural network (CNN) application according to a first embodiment of the present disclosure. The input sequence re-ordering method 100 with the multi input-precision reconfigurable scheme and the pipeline scheme for the CIM macro in the CNN application is configured to re-order a plurality of multi-bit input signals. The multi input-precision reconfigurable scheme represents re-ordering the multi-bit input signals to generate a part of one group of the multi-bit input signals sent to the CIM macro, so that the part of the one group of the multi-bit input signals sent to the CIM macro can utilize a processing principle with a same bit. The pipeline scheme represents performing a multiply-and-accumulate (MAC) calculation in the CIM macro and scanning a next group of the multi-bit input signals in an input sequence re-ordering unit at the same time. The input sequence re-ordering method 100 with the multi input-precision reconfigurable scheme and the pipeline scheme for the CIM macro in the CNN application includes performing a scanning step S02 and a re-ordering step S04.

The scanning step S02 includes driving a scanner to scan one group of the multi-bit input signals to determine whether an initial value of one of a plurality of flag signals in one of a plurality of multi-bit section flags is changed to an inverted initial value according to a plurality of bit numbers of the one group of the multi-bit input signals, and the initial value is different from the inverted initial value. The re-ordering step S04 includes driving a sorter to select a part of the one group of the multi-bit input signals corresponding to a plurality of the inverted initial values of the flag signals in the one of the multi-bit section flags, and then transmit the part of the one group of the multi-bit input signals to the CIM macro. Accordingly, the input sequence re-ordering method 100 with the multi input-precision reconfigurable scheme and the pipeline scheme for the CIM macro in the CNN application of the present disclosure can re-group certain precision of the multi-bit input signals before feeding into the CIM macro, so that the part of the one group of the multi-bit input signals sent to the CIM macro can utilize the processing principle with the same bit to maximize utilization. In addition, the input sequence re-ordering method 100 of the present disclosure may use the scanner to preprocess the multi-bit input signals sent to the CIM macro to speed up the total time of the entire operation process and mainly solve the burden of the CIM macro in processing multi-bit operations.

Figure 2:
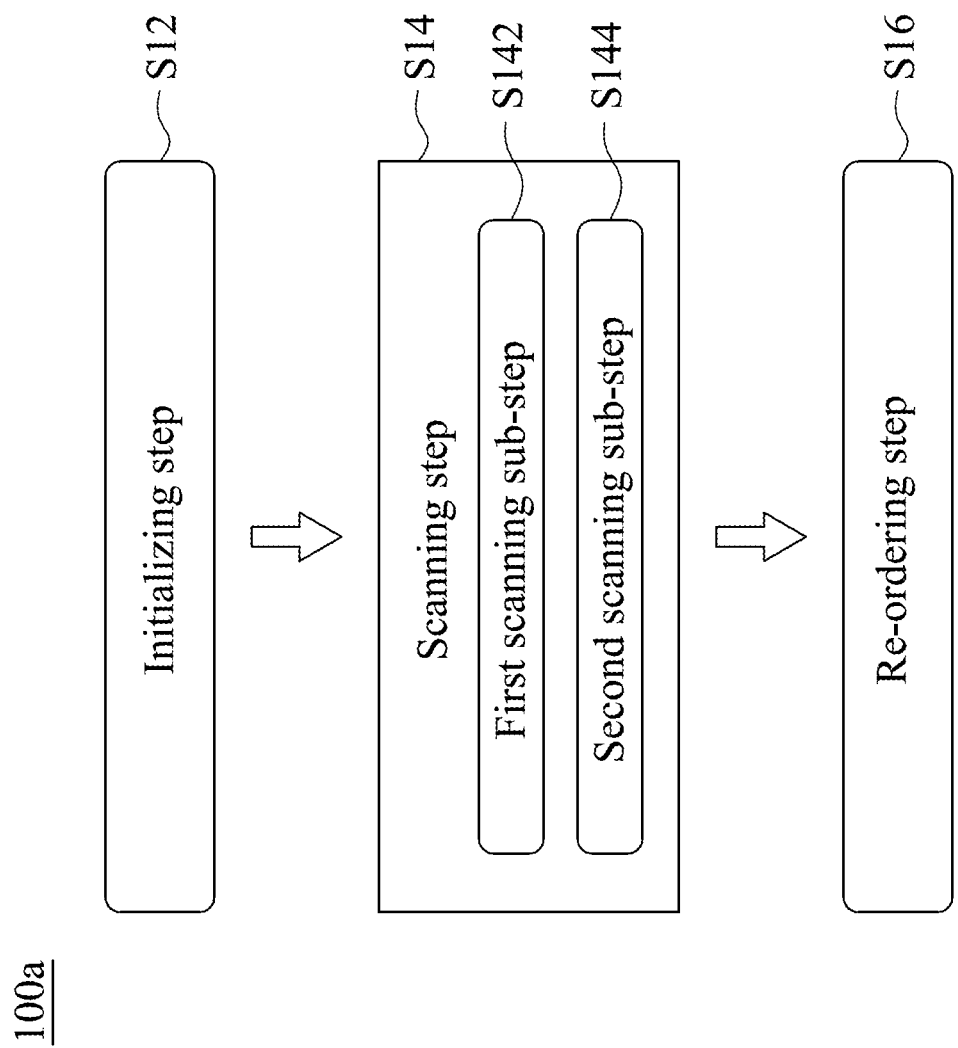
FIG. 2 shows a flow chart of an input sequence re-ordering method with a multi input-precision reconfigurable scheme and a pipeline scheme for a CIM macro in a CNN application according to a second embodiment of the present disclosure.

FIG. 2 shows a flow chart of an input sequence re-ordering method 100a with a multi input-precision reconfigurable scheme and a pipeline scheme for a CIM macro in a CNN application according to a second embodiment of the present disclosure. The input sequence re-ordering method 100a with the multi input-precision reconfigurable scheme and the pipeline scheme for the CIM macro in the CNN application is configured to re-order a plurality of multi-bit input signals and includes performing an initializing step S12, a scanning step S14 and a re-ordering step S16. The initializing step S12, the scanning step S14 and the re-ordering step S16 are performed in sequence.

The initializing step S12 includes driving a sorter to initialize each of a plurality of flag signals in each of a plurality of multi-bit section flags to an initial value, and a number of the flag signals is equal to a number of the multi-bit input signals. A first count number of a first counter and a second count number of a second counter of the sorter are set to 0. A predetermined count number is set to 8. The multi-bit section flags include a first multi-bit section flag and a second multi-bit section flag. The first multi-bit section flag is configured to label at least one N-bit input signal of the multi-bit input signals. The first multi-bit section flag includes a plurality of first flag signals. The number of the first flag signals is equal to the number of the multi-bit input signals, and the first flag signals are corresponding to the multi-bit input signals, respectively. The at least one N-bit input signal is represented by an N bit value, and N is a positive integer. The second multi-bit section flag is configured to label at least one M-bit input signal of the multi-bit input signals. The second multi-bit section flag includes a plurality of second flag signals. The number of the second flag signals is equal to the number of the multi-bit input signals, and the second flag signals are corresponding to the multi-bit input signals, respectively. The at least one M-bit input signal is represented by an M bit value, and M is a positive integer greater than N.

The scanning step S14 includes performing a first scanning sub-step S142 and a second scanning sub-step S144. The first scanning sub-step S142 includes driving a scanner to scan one group of the multi-bit input signals to obtain a plurality of bit numbers of the one group of the multi-bit input signals. The second scanning sub-step S144 includes driving the sorter to determine whether the initial value of one of the first flag signals of the first multi-bit section flag and the second flag signals of the second multi-bit section flag is changed to the inverted initial value according to one of the bit numbers of the one group of the multi-bit input signals. In the second scanning sub-step S144, in response to determining that the one of the bit numbers of the one group of the multi-bit input signals is equal to N, the initial value of one of the first flag signals of the first multi-bit section flag is changed to the inverted initial value, the first count number of the first counter of the sorter is added by 1, and the initial value of one of the second flag signals of the second multi-bit section flag is not changed. In response to determining that the one of the bit numbers of the one group of the multi-bit input signals is equal to M, the initial value of the one of the first flag signals of the first multi-bit section flag is not changed, the initial value of the one of the second flag signals of the second multi-bit section flag is changed to the inverted initial value, and the second count number of the second counter of the sorter is added by 1. The first count number represents a number of a plurality of the first flag signals which are all equal to the inverted initial value in the first multi-bit section flag, and the second count number represents a number of a plurality of the second flag signals which are all equal to the inverted initial value in the second multi-bit section flag.

The re-ordering step S16 includes driving the sorter to select a part of the one group of the multi-bit input signals corresponding to a plurality of the inverted initial values of the flag signals in the one of the multi-bit section flags, and then transmit the part of the one group of the multi-bit input signals to the CIM macro. The re-ordering step S16 further includes in response to determining that the first count number reaches a predetermined count number, setting the part of the one group of the multi-bit input signals to a plurality of the multi-bit input signals corresponding to the first flag signals which are all equal to the inverted initial value. The re-ordering step S16 further includes in response to determining that the second count number reaches the predetermined count number, setting the part of the one group of the multi-bit input signals to a plurality of the multi-bit input signals corresponding to the second flag signals which are all equal to the inverted initial value.

Figure 3:
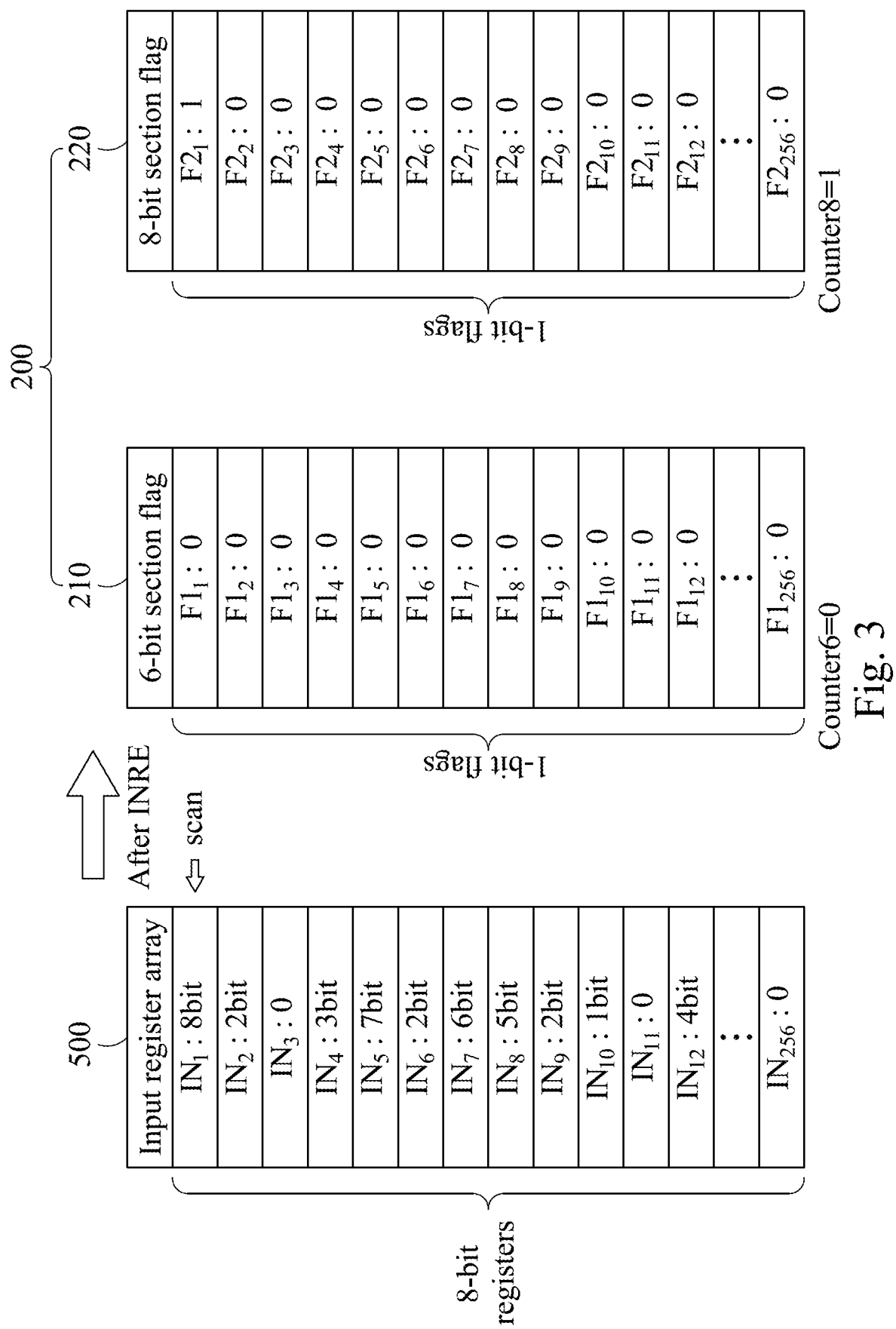
FIG. 3 shows a schematic view of a scanner scanning a first multi-bit input signal of one group of the multi-bit input signals in the input sequence re-ordering method of FIG. 2.
Figure 4:
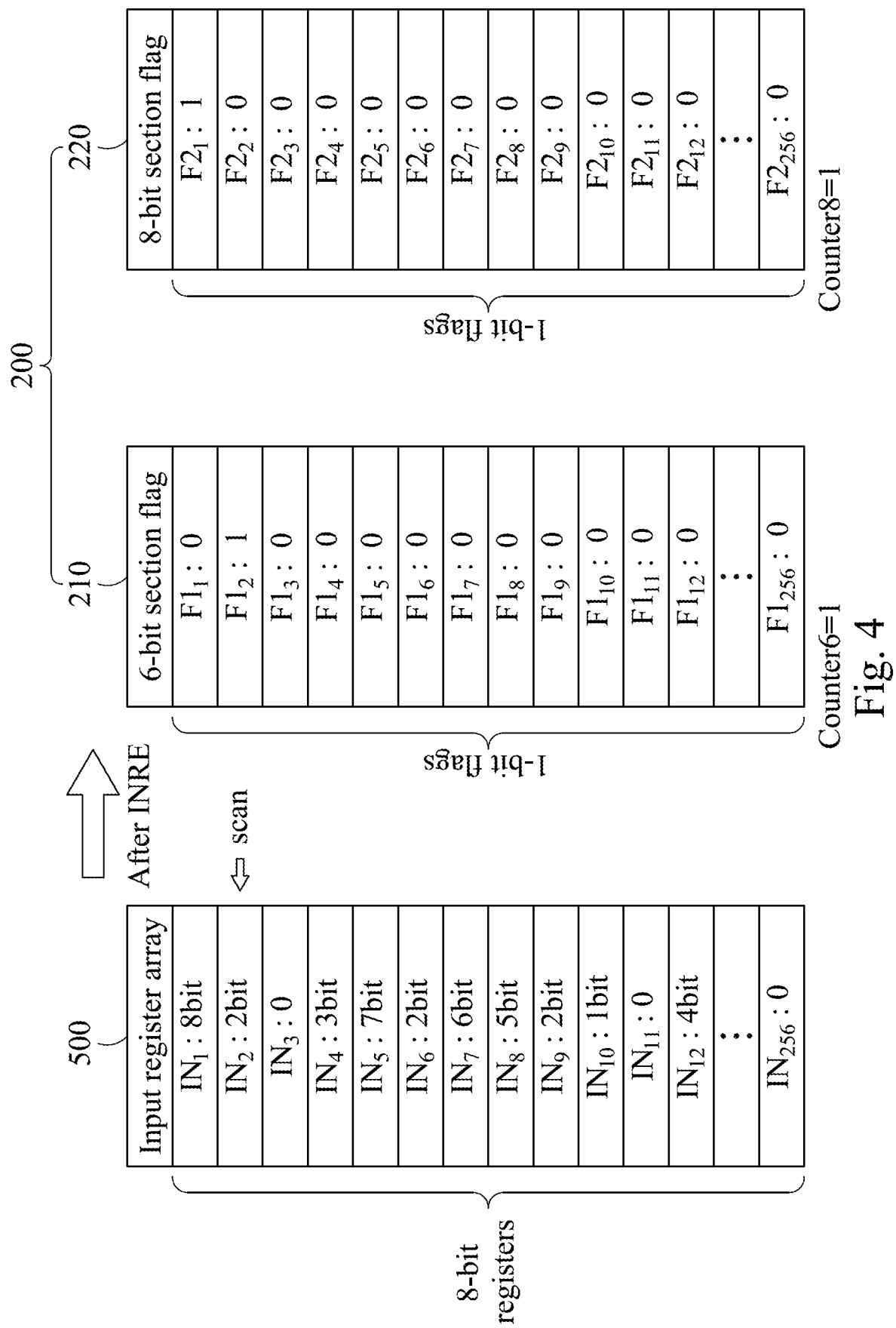
FIG. 4 shows a schematic view of the scanner scanning a second multi-bit input signal of the one group of the multi-bit input signals in the input sequence re-ordering method of FIG. 2.
Figure 5:
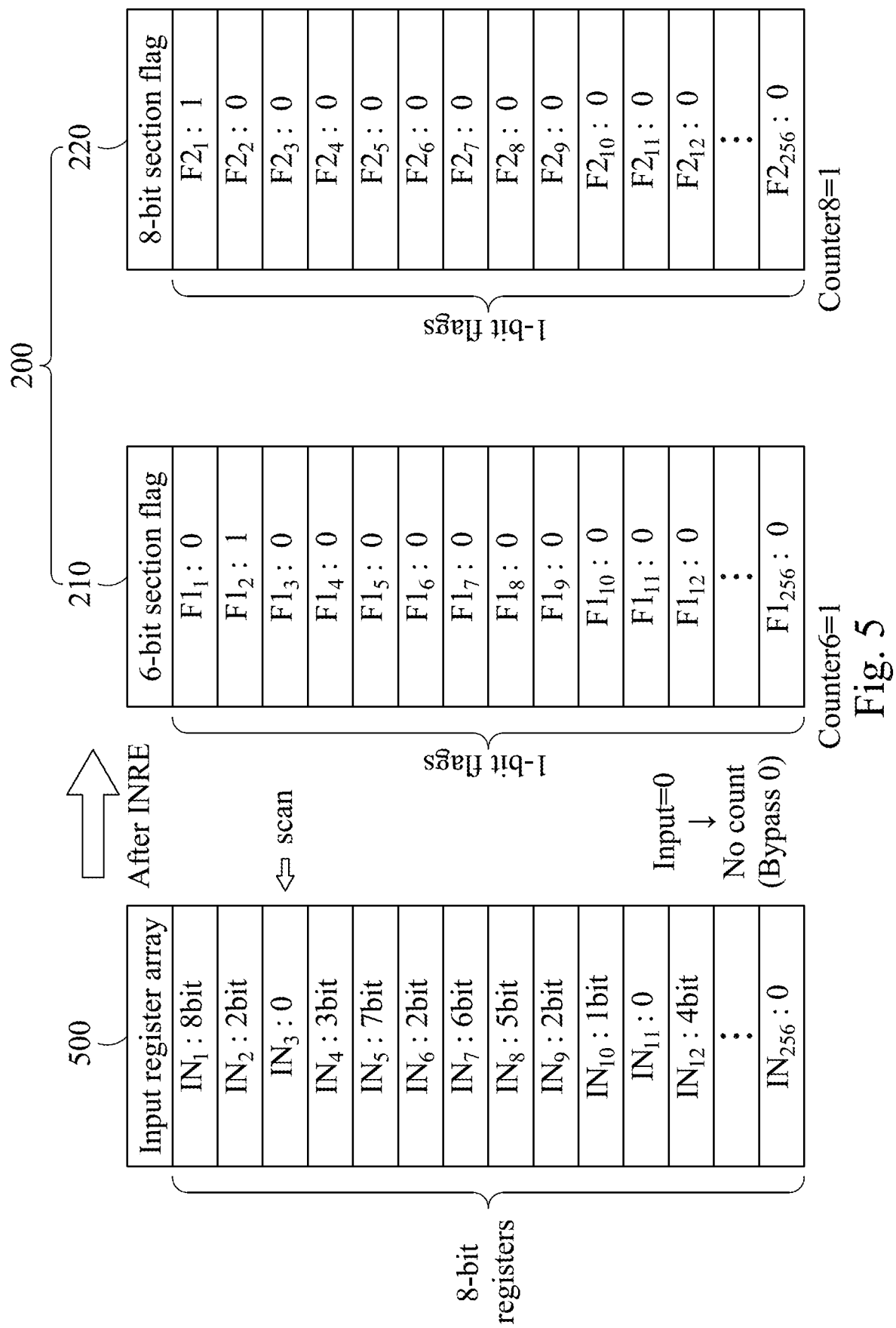
FIG. 5 shows a schematic view of the scanner scanning a third multi-bit input signal of the one group of the multi-bit input signals in the input sequence re-ordering method of FIG. 2.
Figure 6:
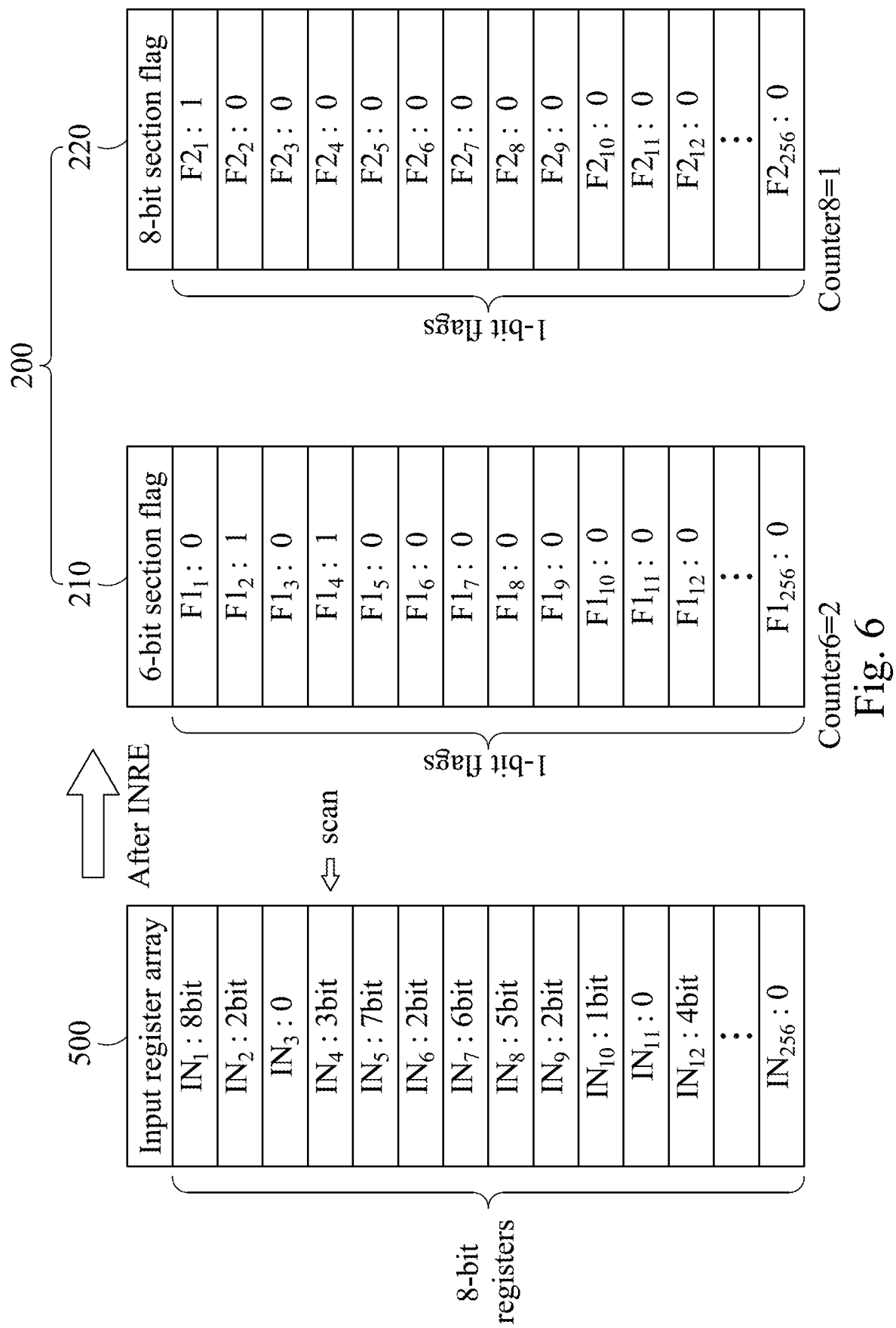
FIG. 6 shows a schematic view of the scanner scanning a fourth multi-bit input signal of the one group of the multi-bit input signals in the input sequence re-ordering method of FIG. 2.
Figure 7:
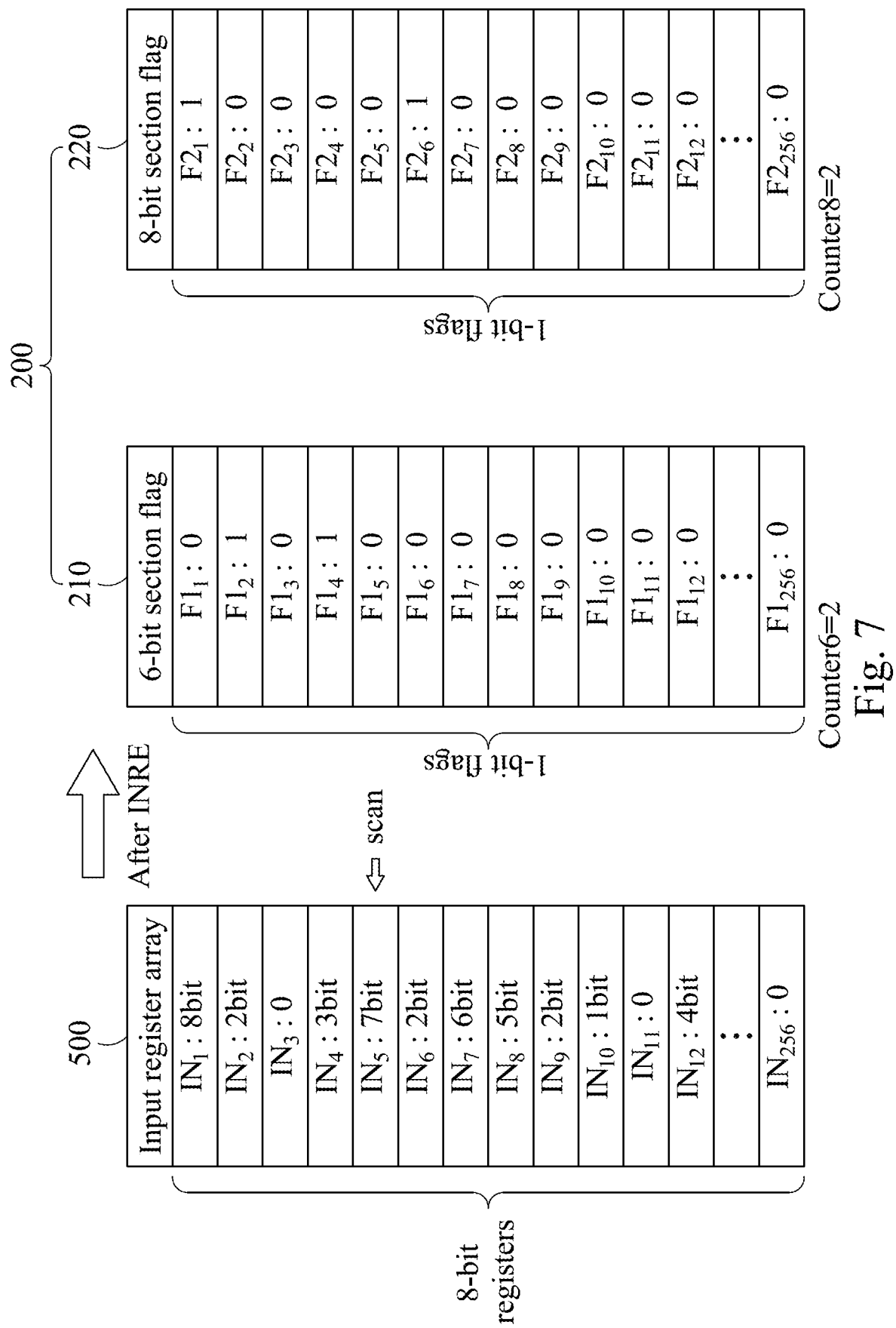
FIG. 7 shows a schematic view of the scanner scanning a fifth multi-bit input signal of the one group of the multi-bit input signals in the input sequence re-ordering method of FIG. 2.
Figure 8:
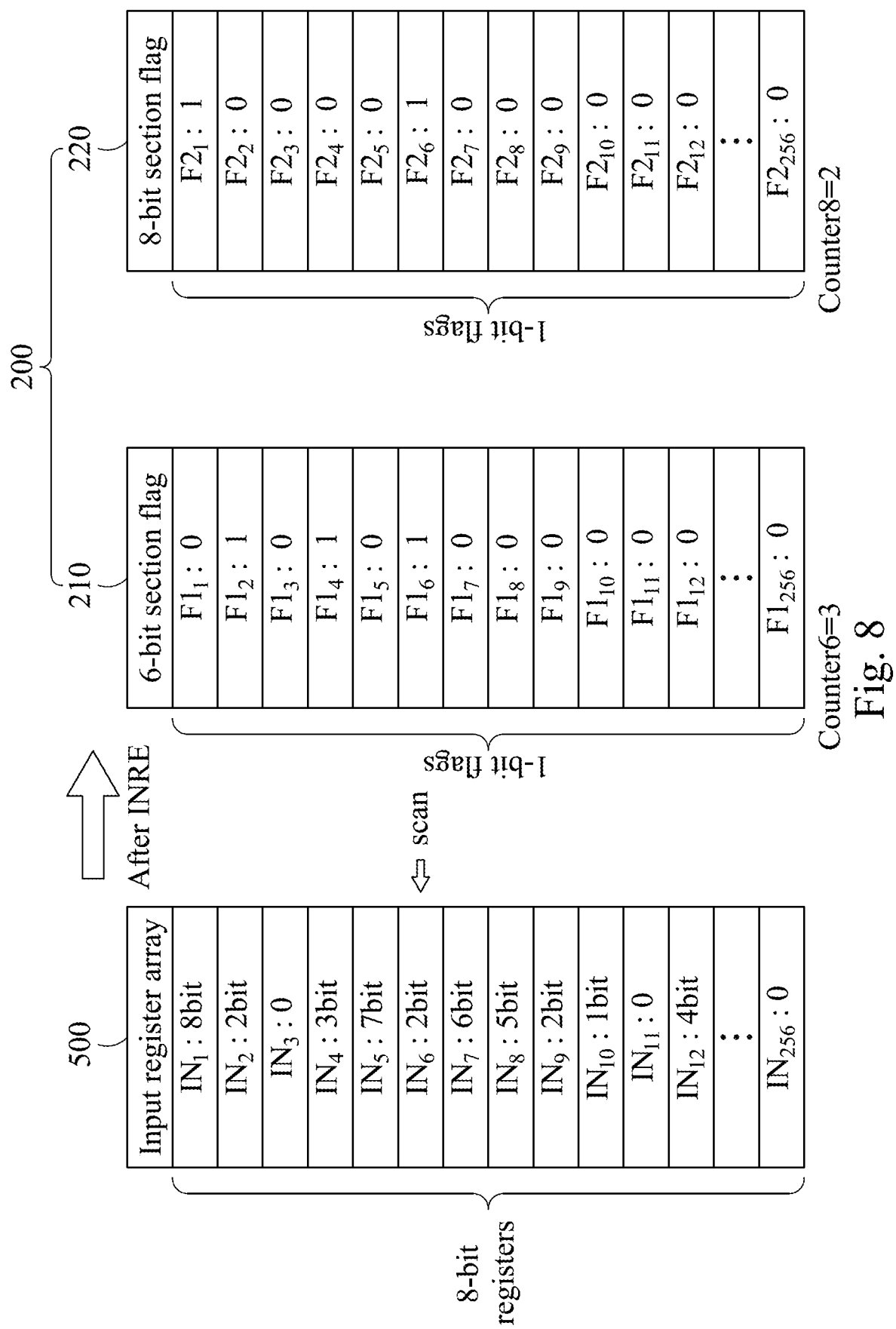
FIG. 8 shows a schematic view of the scanner scanning a sixth multi-bit input signal of the one group of the multi-bit input signals in the input sequence re-ordering method of FIG. 2.
Figure 9:
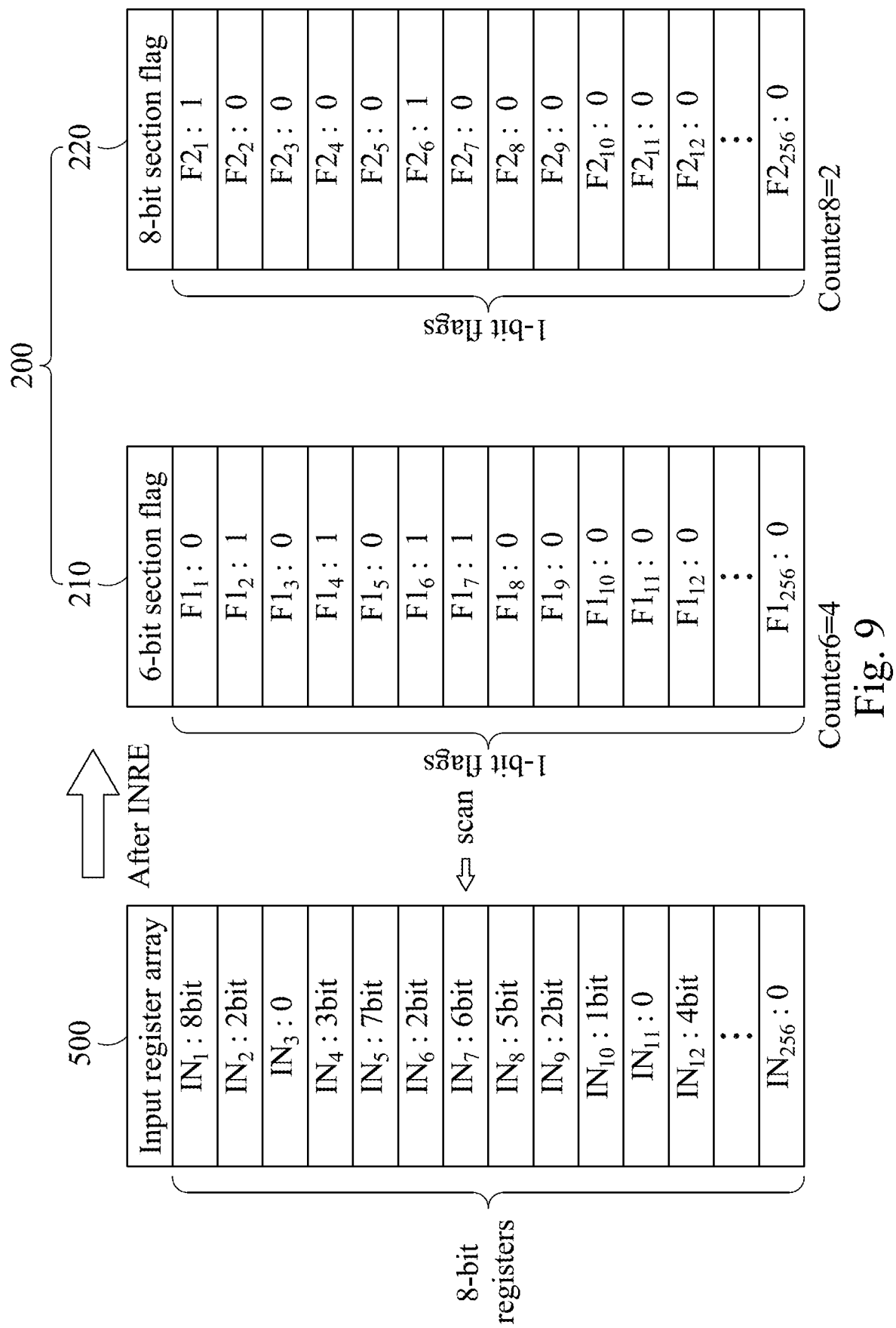
FIG. 9 shows a schematic view of the scanner scanning a seventh multi-bit input signal of the one group of the multi-bit input signals in the input sequence re-ordering method of FIG. 2.
Figure 10:
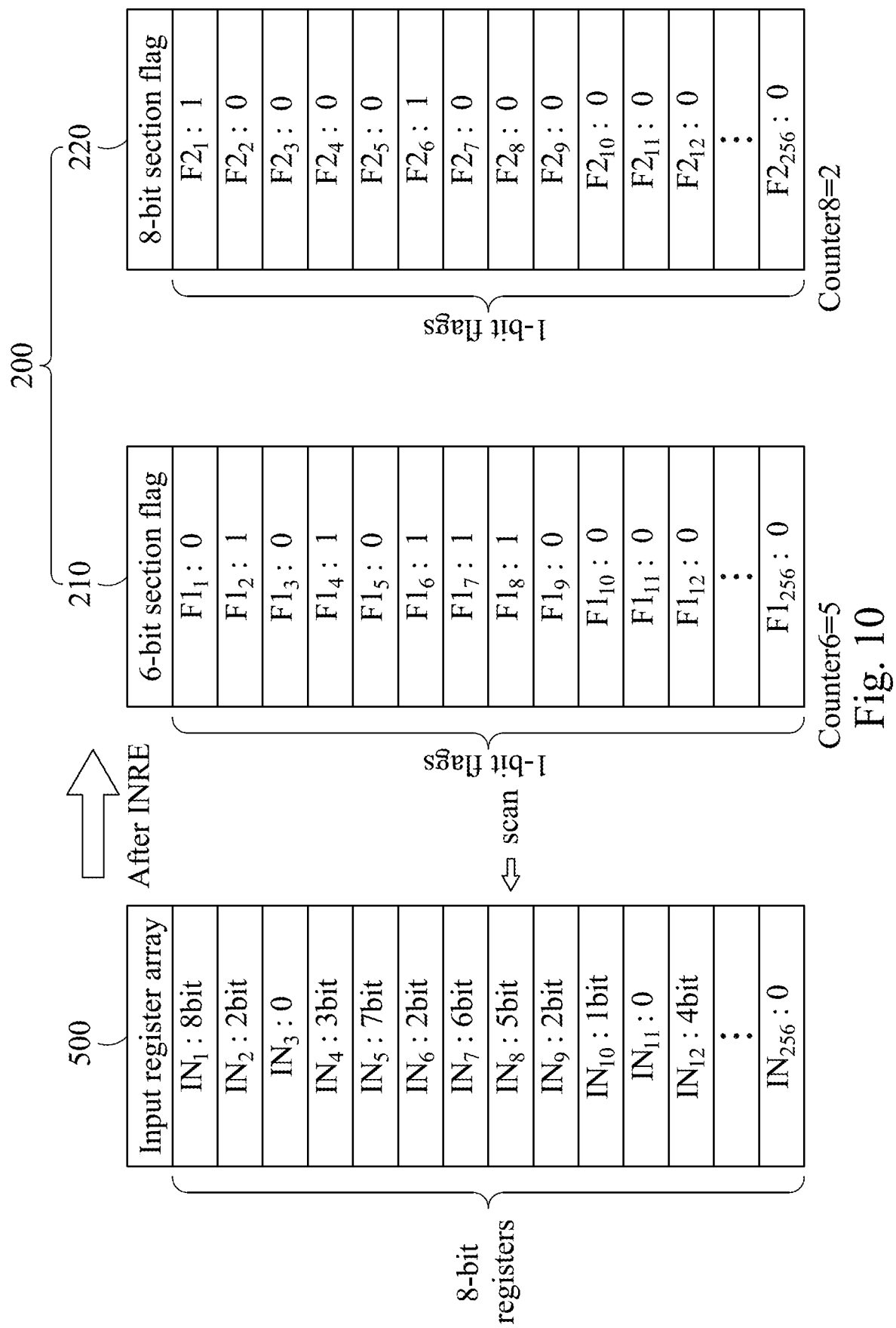
FIG. 10 shows a schematic view of the scanner scanning an eighth multi-bit input signal of the one group of the multi-bit input signals in the input sequence re-ordering method of FIG. 2.
Figure 11:
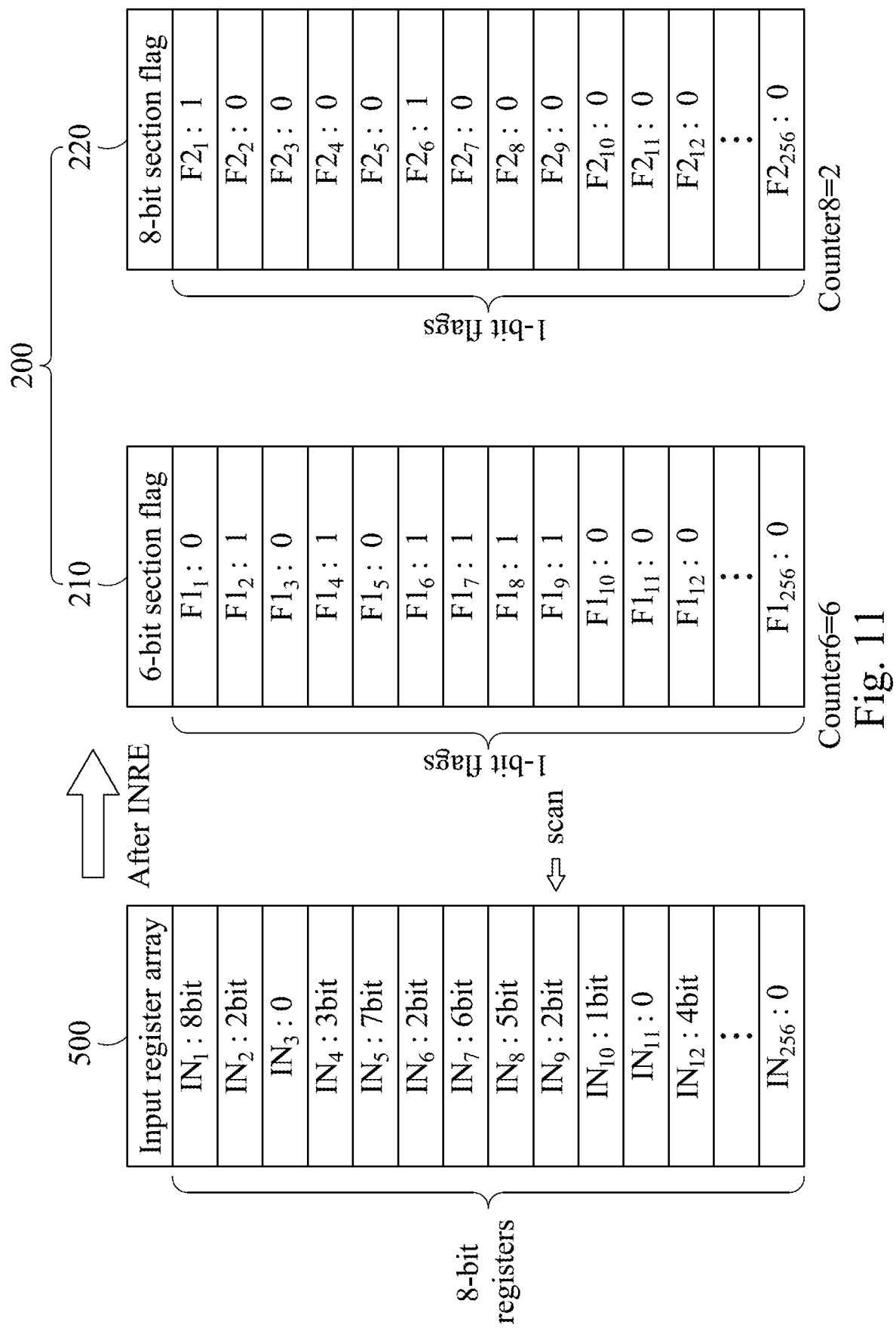
FIG. 11 shows a schematic view of the scanner scanning a ninth multi-bit input signal of the one group of the multi-bit input signals in the input sequence re-ordering method of FIG. 2.
Figure 12:
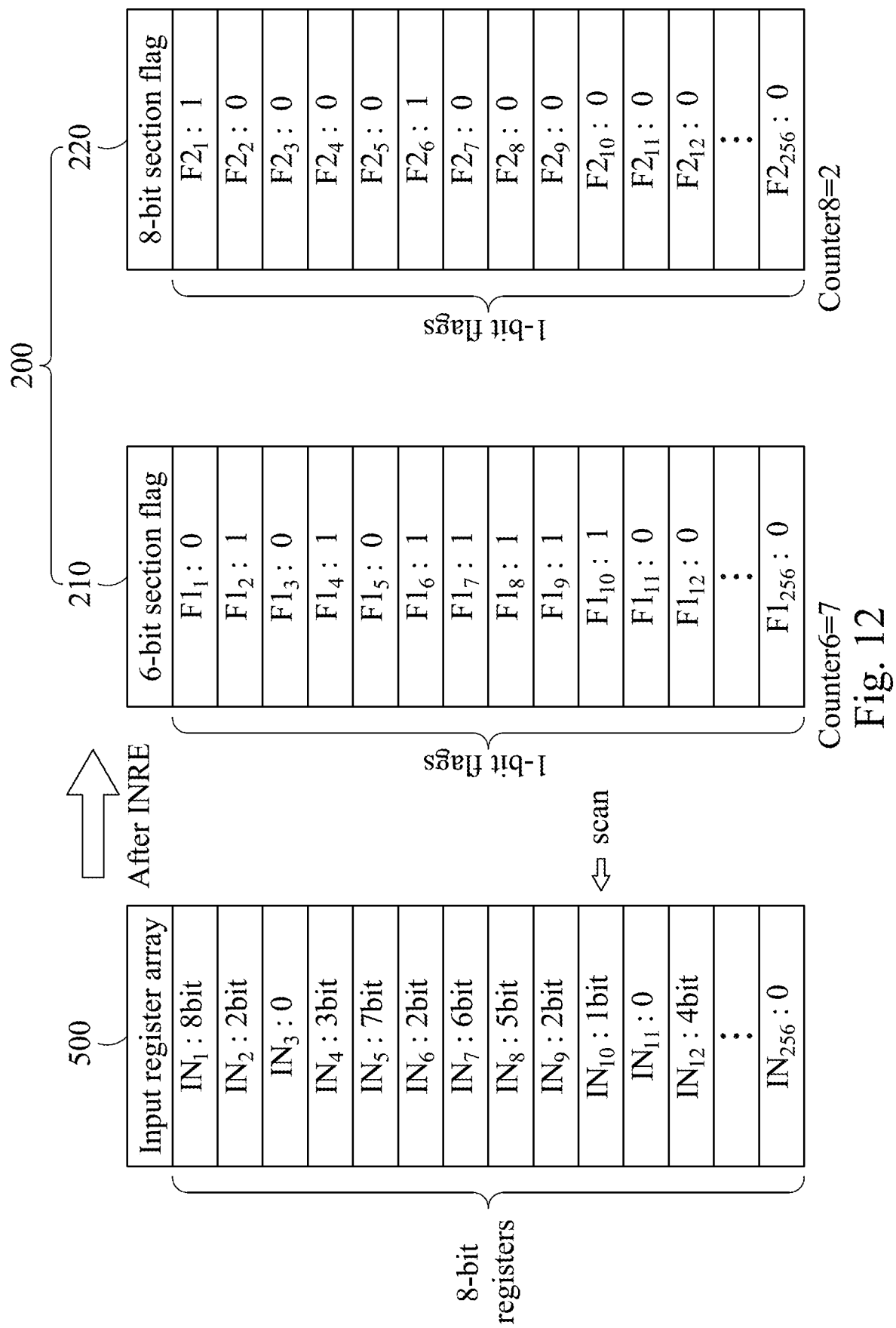
FIG. 12 shows a schematic view of the scanner scanning a tenth multi-bit input signal of the one group of the multi-bit input signals in the input sequence re-ordering method of FIG. 2.
Figure 13:
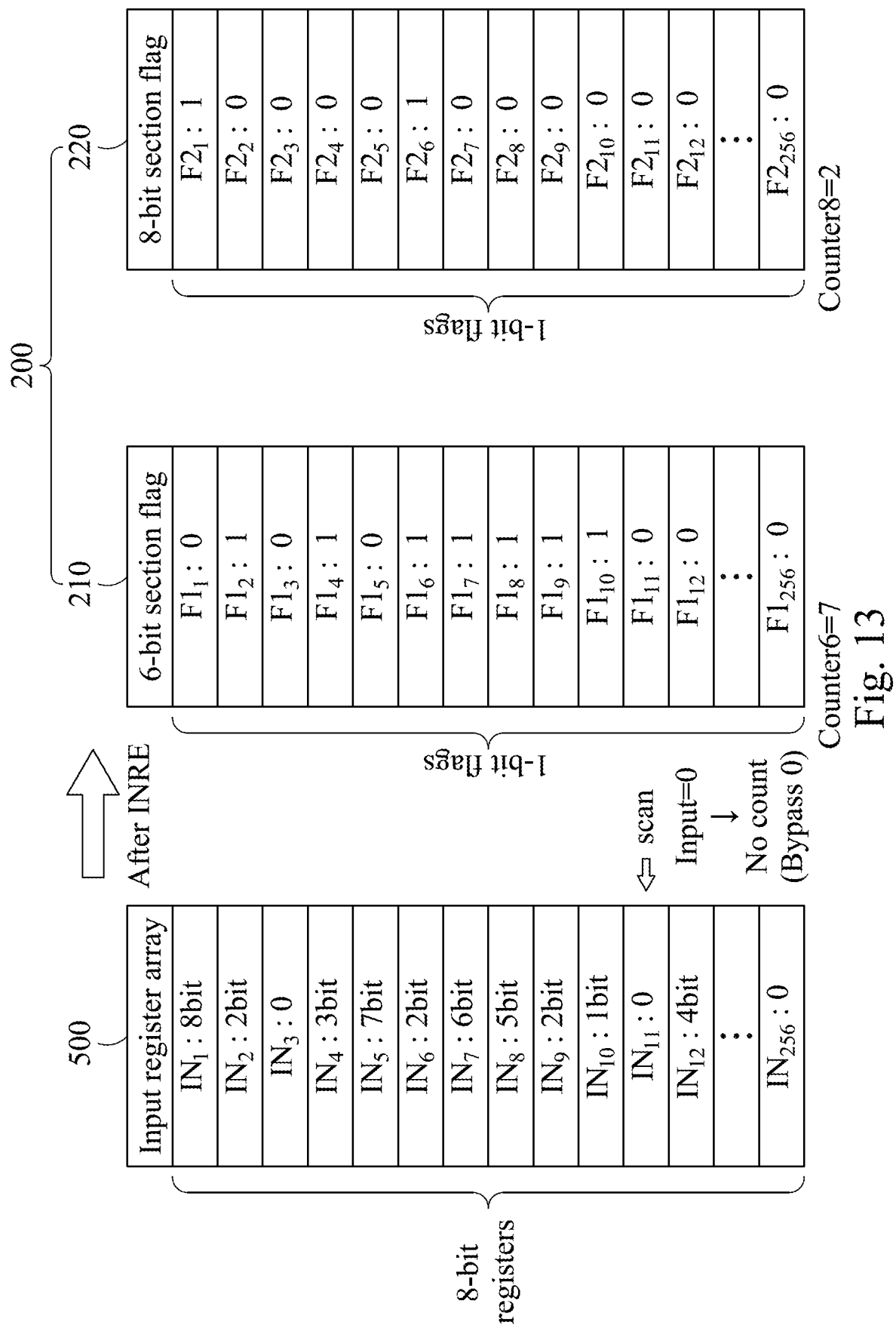
FIG. 13 shows a schematic view of the scanner scanning an eleventh multi-bit input signal of the one group of the multi-bit input signals in the input sequence re-ordering method of FIG. 2.
Figure 14:
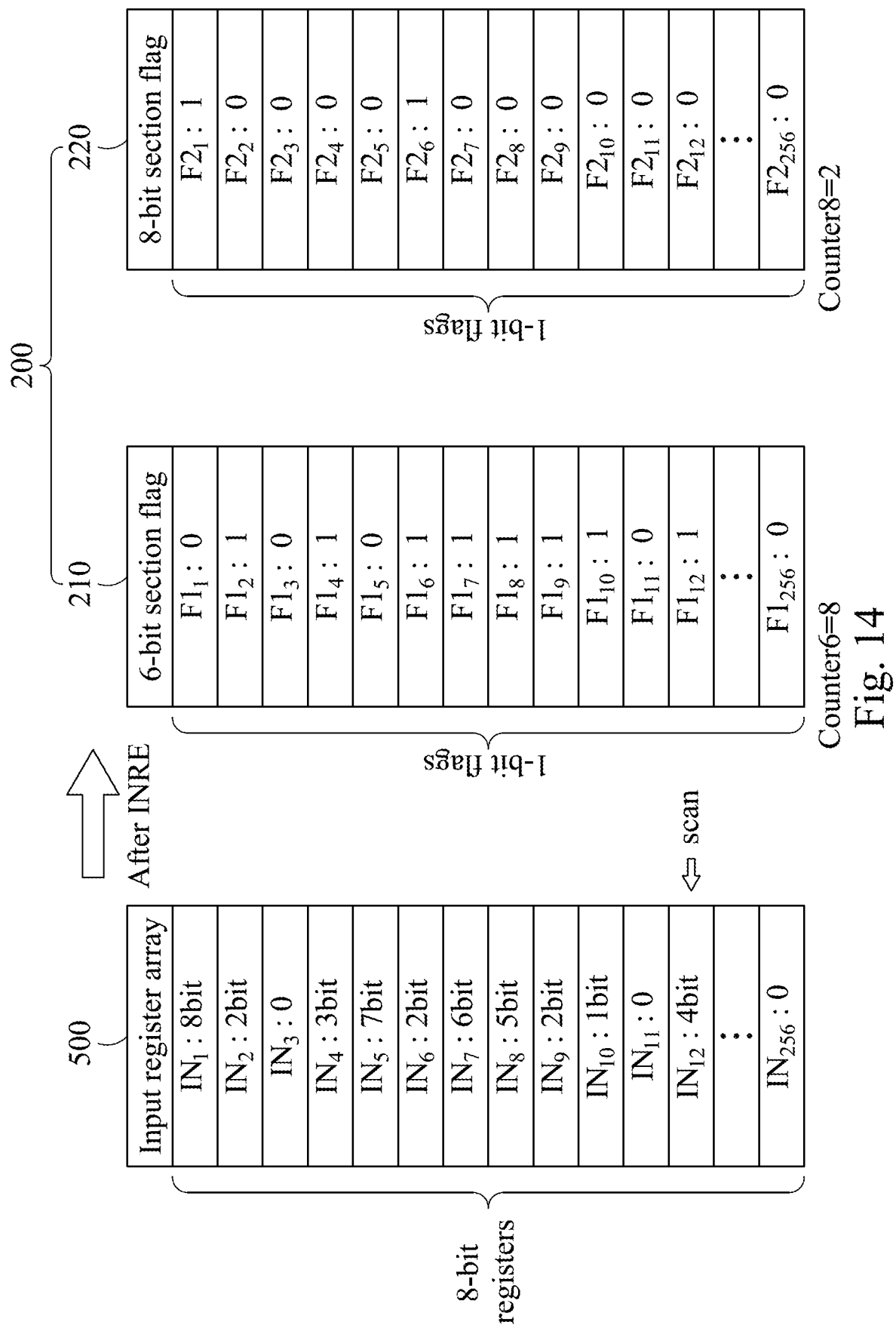
FIG. 14 shows a schematic view of the scanner scanning a twelfth multi-bit input signal of the one group of the multi-bit input signals in the input sequence re-ordering method of FIG. 2.

FIG. 3 shows a schematic view of the scanner scanning a first multi-bit input signal $IN_1$ of the one group (e.g., $IN_1$-$IN_{12}$) of the multi-bit input signals $IN_1$-$IN_{256}$ in the input sequence re-ordering method 100a of FIG. 2. FIG. 4 shows a schematic view of the scanner scanning a second multi-bit input signal $IN_2$ of the one group of the multi-bit input signals $IN_1$-$IN_{256}$ in the input sequence re-ordering method 100a of FIG. 2. FIG. 5 shows a schematic view of the scanner scanning a third multi-bit input signal $IN_3$ of the one group of the multi-bit input signals $IN_1$-$IN_{256}$ in the input sequence re-ordering method 100a of FIG. 2. FIG. 6 shows a schematic view of the scanner scanning a fourth multi-bit input signal $IN_4$ of the one group of the multi-bit input signals $IN_1$-$IN_{256}$ in the input sequence re-ordering method 100a of FIG. 2. FIG. 7 shows a schematic view of the scanner scanning a fifth multi-bit input signal $IN_5$ of the one group of the multi-bit input signals $IN_1$-$IN_{256}$ in the input sequence re-ordering method 100a of FIG. 2. FIG. 8 shows a schematic view of the scanner scanning a sixth multi-bit input signal $IN_6$ of the one group of the multi-bit input signals $IN_1$-$IN_{256}$ in the input sequence re-ordering method 100a of FIG. 2. FIG. 9 shows a schematic view of the scanner scanning a seventh multi-bit input signal $IN_7$ of the one group of the multi-bit input signals $IN_1$-$IN_{256}$ in the input sequence re-ordering method 100a of FIG. 2. FIG. 10 shows a schematic view of the scanner scanning an eighth multi-bit input signal $IN_8$ of the one group of the multi-bit input signals $IN_1$-$IN_{256}$ in the input sequence re-ordering method 100a of FIG. 2. FIG. 11 shows a schematic view of the scanner scanning a ninth multi-bit input signal $IN_9$ of the one group of the multi-bit input signals $IN_1$-$IN_{256}$ in the input sequence re-ordering method 100a of FIG. 2. FIG. 12 shows a schematic view of the scanner scanning a tenth multi-bit input signal $IN_{10}$ of the one group of the multi-bit input signals $IN_1$-$IN_{256}$ in the input sequence re-ordering method 100a of FIG. 2. FIG. 13 shows a schematic view of the scanner scanning an eleventh multi-bit input signal $IN_{11}$ of the one group of the multi-bit input signals $IN_1$-$IN_{256}$ in the input sequence re-ordering method 100a of FIG. 2. FIG. 14 shows a schematic view of the scanner scanning a twelfth multi-bit input signal $IN_{12}$ of the one group of the multi-bit input signals $IN_1$-$IN_{256}$ in the input sequence re-ordering method 100a of FIG. 2.

In FIGS. 3-14, each of the multi-bit input signals $IN_1$-$IN_{256}$ in an input register array 500 has eight bits. The initial value is equal to 0, and the inverted initial value is equal to 1. The multi-bit input signals $IN_1$-$IN_{256}$ include a first input sub-group (i.e., all N-bit input signals in the one group where N=1-6), a second input sub-group (i.e., all M-bit input signals in the one group where M=7-8) and a third input sub-group (i.e., input signals=0). The first input sub-group and the second input sub-group have six bits and eight bits, respectively. In other words, the first input sub-group, the second input sub-group and the third input sub-group are regarded as a low-byte group (6-bit group), a high-byte group (8-bit group) and a zero group, respectively. The first input sub-group includes the multi-bit input signals $IN_2$, $IN_4$, $IN_6$-$IN_{10}$, $IN_{12}$. The second input sub-group includes the multi-bit input signals $IN_1$, $IN_5$. The third input sub-group includes the multi-bit input signals $IN_3$, $IN_{11}$. In addition, the multi-bit section flags 200 include a first multi-bit section flag 210 and a second multi-bit section flag 220. The first multi-bit section flag 210 is represented by "6-bit section flag" and configured to label at least one N-bit input signal of the multi-bit input signals $IN_1$-$IN_{256}$. The second multi-bit section flag 220 is represented by "8-bit section flag" and configured to label at least one M-bit input signal of the multi-bit input signals $IN_1$-$IN_{256}$. The first multi-bit section flag 210 includes a plurality of first flag signals $F1_1$-$F1_{256}$. The number of the first flag signals $F1_1$-$F1_{256}$ is equal to a number of the multi-bit input signals $IN_1$-$IN_{256}$. The first flag signals $F1_1$-$F1_{256}$ are corresponding to the multi-bit input signals $IN_1$-$IN_{256}$, respectively. The at least one N-bit input signal is represented by an N bit value, and N is a positive integer. The second multi-bit section flag 220 includes a plurality of second flag signals $F2_1$-$F2_{256}$. The number of the second flag signals $F2_1$-$F2_{256}$ is equal to the number of the multi-bit input signals $IN_1$-$IN_{256}$, and the second flag signals $F2_1$-$F2_{256}$ are corresponding to the multi-bit input signals $IN_1$-$IN_{256}$, respectively. The at least one M-bit input signal is represented by an M bit value, and M is a positive integer greater than N. In one embodiment, N is equal to 1, 2, 3, 4, 5 or 6. M is equal to 7 or 8. Each of the first flag signals $F1_1$-$F1_{256}$ and the second flag signals $F2_1$-$F2_{256}$ has one bit, i.e., 1-bit flag. Each of the first multi-bit section flag 210 and the second multi-bit section flag 220 has 256×1 bit.

In FIGS. 2 and 3, the scanner is driven to scan the first multi-bit input signal $IN_1$ to obtain a bit number of the first multi-bit input signal $IN_1$ (i.e., 8 bit), and the sorter is driven to determine whether the initial value of one of the first flag signal $F1_1$ of the first multi-bit section flag 210 and the second flag signal $F2_1$ of the second multi-bit section flag 220 is changed to the inverted initial value according to the bit number of the first multi-bit input signal $IN_1$. Because the bit number of the first multi-bit input signal $IN_1$ is equal to M, the initial value of the first flag signal $F1_1$ of the first multi-bit section flag 210 is not changed, and the initial value of the second flag signal $F2_1$ of the second multi-bit section flag 220 is changed to the inverted initial value. The second count number Counter8 of the second counter of the sorter is added by 1 (i.e., Counter8=1).

In FIGS. 2 and 4, the scanner is driven to scan the second multi-bit input signal $IN_2$ to obtain a bit number of the second multi-bit input signal $IN_2$ (i.e., 2 bit), and the sorter is driven to determine whether the initial value of one of the first flag signal $F1_2$ of the first multi-bit section flag 210 and the initial value of the second flag signal $F2_2$ of the second multi-bit section flag 220 is changed to the inverted initial value according to the bit number of the second multi-bit input signal $IN_2$. Because the bit number of the second multi-bit input signal $IN_2$ is equal to N, the initial value of the first flag signal $F1_2$ of the first multi-bit section flag 210 is changed to the inverted initial value, and the initial value of one of the second flag signals $F2_2$ of the second multi-bit section flag 220 is not changed. The first count number Counter6 of the first counter of the sorter is added by 1 (i.e., Counter6=1).

In FIGS. 2 and 5, the scanner is driven to scan the third multi-bit input signal $IN_3$ to obtain a bit number of the third multi-bit input signal $IN_3$ (i.e., 0), and the sorter is driven to determine whether the initial value of one of the first flag signal $F1_3$ of the first multi-bit section flag 210 and the initial value of the second flag signal $F2_3$ of the second multi-bit section flag 220 is changed to the inverted initial value according to the bit number of the third multi-bit input signal $IN_3$. Because the third multi-bit input signal $IN_3$ is equal to 0, the initial value of the first flag signal $F1_3$ of the first multi-bit section flag 210 and the initial value of one of the second flag signals $F2_3$ of the second multi-bit section flag 220 are not changed. The first count number Counter6 of the first counter and the second count number Counter8 of the second counter of the sorter are still maintained (i.e., Counter6=1, and Counter8=1).

In FIGS. 2 and 6, the scanner is driven to scan the fourth multi-bit input signal $IN_4$ to obtain a bit number of the fourth multi-bit input signal $IN_4$ (i.e., 3 bit), and the sorter is driven to determine whether the initial value of one of the first flag signal $F1_4$ of the first multi-bit section flag 210 and the initial value of the second flag signal $F2_4$ of the second multi-bit section flag 220 is changed to the inverted initial value according to the bit number of the fourth multi-bit input signal $IN_4$. Because the bit number of the fourth multi-bit input signal $IN_4$ is equal to N, the initial value of the first flag signal $F1_4$ of the first multi-bit section flag 210 is changed to the inverted initial value, and the initial value of one of the second flag signals $F2_4$ of the second multi-bit section flag 220 is not changed. The first count number Counter6 of the first counter of the sorter is added by 1 (i.e., Counter6=2).

In FIGS. 2 and 7, the scanner is driven to scan the fifth multi-bit input signal $IN_5$ to obtain a bit number of the fifth multi-bit input signal $IN_5$ (i.e., 7 bit), and the sorter is driven to determine whether the initial value of one of the first flag signal $F1_5$ of the first multi-bit section flag 210 and the second flag signal $F2_5$ of the second multi-bit section flag 220 is changed to the inverted initial value according to the bit number of the fifth multi-bit input signal $IN_5$. Because the bit number of the fifth multi-bit input signal $IN_5$ is equal to M, the initial value of the first flag signal $F1_5$ of the first multi-bit section flag 210 is not changed, and the initial value of the second flag signal $F2_5$ of the second multi-bit section flag 220 is changed to the inverted initial value. The second count number Counter8 of the second counter of the sorter is added by 1 (i.e., Counter8=2).

In FIGS. 2 and 8, the scanner is driven to scan the sixth multi-bit input signal $IN_6$ to obtain a bit number of the sixth multi-bit input signal $IN_6$ (i.e., 2 bit), and the sorter is driven to determine whether the initial value of one of the first flag signal $F1_6$ of the first multi-bit section flag 210 and the initial value of the second flag signal $F2_6$ of the second multi-bit section flag 220 is changed to the inverted initial value according to the bit number of the sixth multi-bit input signal $IN_6$. Because the bit number of the sixth multi-bit input signal $IN_6$ is equal to N, the initial value of the first flag signal $F1_6$ of the first multi-bit section flag 210 is changed to the inverted initial value, and the initial value of one of the second flag signals $F2_6$ of the second multi-bit section flag 220 is not changed. The first count number Counter6 of the first counter of the sorter is added by 1 (i.e., Counter6=3).

In FIGS. 2 and 9, the scanner is driven to scan the seventh multi-bit input signal $IN_7$ to obtain a bit number of the seventh multi-bit input signal $IN_7$ (i.e., Gbit), and the sorter is driven to determine whether the initial value of one of the first flag signal $F1_7$ of the first multi-bit section flag 210 and the initial value of the second flag signal $F2_7$ of the second multi-bit section flag 220 is changed to the inverted initial value according to the bit number of the seventh multi-bit input signal $IN_7$. Because the bit number of the seventh multi-bit input signal $IN_7$ is equal to N, the initial value of the first flag signal $F1_7$ of the first multi-bit section flag 210 is changed to the inverted initial value, and the initial value of one of the second flag signals $F2_7$ of the second multi-bit section flag 220 is not changed. The first count number Counter6 of the first counter of the sorter is added by 1 (i.e., Counter6=4).

In FIGS. 2 and 10, the scanner is driven to scan the eighth multi-bit input signal $IN_8$ to obtain a bit number of the eighth multi-bit input signal $IN_8$ (i.e., 5 bit), and the sorter is driven to determine whether the initial value of one of the first flag signal $F1_8$ of the first multi-bit section flag 210 and the initial value of the second flag signal $F2_8$ of the second multi-bit section flag 220 is changed to the inverted initial value according to the bit number of the eighth multi-bit input signal $IN_8$. Because the bit number of the eighth multi-bit input signal $IN_8$ is equal to N, the initial value of the first flag signal $F1_8$ of the first multi-bit section flag 210 is changed to the inverted initial value, and the initial value of one of the second flag signals $F2_8$ of the second multi-bit section flag 220 is not changed. The first count number Counter6 of the first counter of the sorter is added by 1 (i.e., Counter6=5).

In FIGS. 2 and 11, the scanner is driven to scan the ninth multi-bit input signal $IN_9$ to obtain a bit number of the ninth multi-bit input signal $IN_9$ (i.e., 2 bit), and the sorter is driven to determine whether the initial value of one of the first flag signal $F1_9$ of the first multi-bit section flag 210 and the initial value of the second flag signal $F2_9$ of the second multi-bit section flag 220 is changed to the inverted initial value according to the bit number of the ninth multi-bit input signal $IN_9$. Because the bit number of the ninth multi-bit input signal $IN_9$ is equal to N, the initial value of the first flag signal $F1_9$ of the first multi-bit section flag 210 is changed to the inverted initial value, and the initial value of one of the second flag signals $F2_9$ of the second multi-bit section flag 220 is not changed. The first count number Counter6 of the first counter of the sorter is added by 1 (i.e., Counter6=6).

In FIGS. 2 and 12, the scanner is driven to scan the tenth multi-bit input signal $IN_{10}$ to obtain a bit number of the tenth multi-bit input signal $IN_{10}$ (i.e., 1 bit), and the sorter is driven to determine whether the initial value of one of the first flag signal $F1_{10}$ of the first multi-bit section flag 210 and the initial value of the second flag signal $F2_{10}$ of the second multi-bit section flag 220 is changed to the inverted initial value according to the bit number of the tenth multi-bit input signal $IN_{10}$. Because the bit number of the tenth multi-bit input signal $IN_{10}$ is equal to N, the initial value of the first flag signal $F1_{10}$ of the first multi-bit section flag 210 is changed to the inverted initial value, and the initial value of one of the second flag signals $F2_{10}$ of the second multi-bit section flag 220 is not changed. The first count number Counter6 of the first counter of the sorter is added by 1 (i.e., Counter6=7).

In FIGS. 2 and 13, the scanner is driven to scan the eleventh multi-bit input signal $IN_{11}$ to obtain a bit number of the eleventh multi-bit input signal $IN_{11}$ (i.e., 0), and the sorter is driven to determine whether the initial value of one of the first flag signal $F1_{11}$ of the first multi-bit section flag 210 and the initial value of the second flag signal $F2_{11}$ of the second multi-bit section flag 220 is changed to the inverted initial value according to the bit number of the eleventh multi-bit input signal $IN_{11}$. Because the eleventh multi-bit input signal $IN_{11}$ is equal to 0, the initial value of the first flag signal $F1_{11}$ of the first multi-bit section flag 210 and the initial value of one of the second flag signals $F2_{11}$ of the second multi-bit section flag 220 are not changed. The first count number Counter6 of the first counter and the second count number Counter8 of the second counter of the sorter are still maintained (i.e., Counter6=7, and Counter8=2).

In FIGS. 2 and 14, the scanner is driven to scan the twelfth multi-bit input signal $IN_{12}$ to obtain a bit number of the twelfth multi-bit input signal $IN_{12}$ (i.e., 4 bit), and the sorter is driven to determine whether the initial value of one of the first flag signal $F1_{12}$ of the first multi-bit section flag 210 and the initial value of the second flag signal $F2_{12}$ of the second multi-bit section flag 220 is changed to the inverted initial value according to the bit number of the twelfth multi-bit input signal $IN_{12}$. Because the bit number of the twelfth multi-bit input signal $IN_{12}$ is equal to N, the initial value of the first flag signal $F1_{12}$ of the first multi-bit section flag 210 is changed to the inverted initial value, and the initial value of one of the second flag signals $F2_{12}$ of the second multi-bit section flag 220 is not changed. The first count number Counter6 of the first counter of the sorter is added by 1 (i.e., Counter6=8).

In response to determining that the first count number Counter6 reaches the predetermined count number (e.g., 8), the sorter is driven to set the part of the one group of the multi-bit input signals $IN_1$-$IN_{256}$ to a plurality of the multi-bit input signals (e.g., $IN_2$, $IN_4$, $IN_6$-$IN_{10}$, $IN_{12}$) corresponding to the first flag signals which are all equal to the inverted initial value.

Therefore, the input sequence re-ordering method 100a with the multi input-precision reconfigurable scheme and the pipeline scheme for the CIM macro in the CNN application of the present disclosure can re-group certain precision of the multi-bit input signals $IN_1$-$IN_{256}$ before feeding into the CIM macro, so that the part of the one group of the multi-bit input signals $IN_1$-$IN_{256}$ sent to the CIM macro can utilize the processing principle with the same bit to maximize utilization. In addition, the input sequence re-ordering method 100a of the present disclosure may use the scanner to preprocess the multi-bit input signals $IN_1$-$IN_{256}$ sent to the CIM macro to speed up the total time of the entire operation process and mainly solve the burden of the CIM macro in processing multi-bit operations.

Figure 15:
FIG. 15 shows a flow chart of an input sequence re-ordering method with a multi input-precision reconfigurable scheme and a pipeline scheme for a CIM macro in a CNN application according to a third embodiment of the present disclosure.
Figure 16:
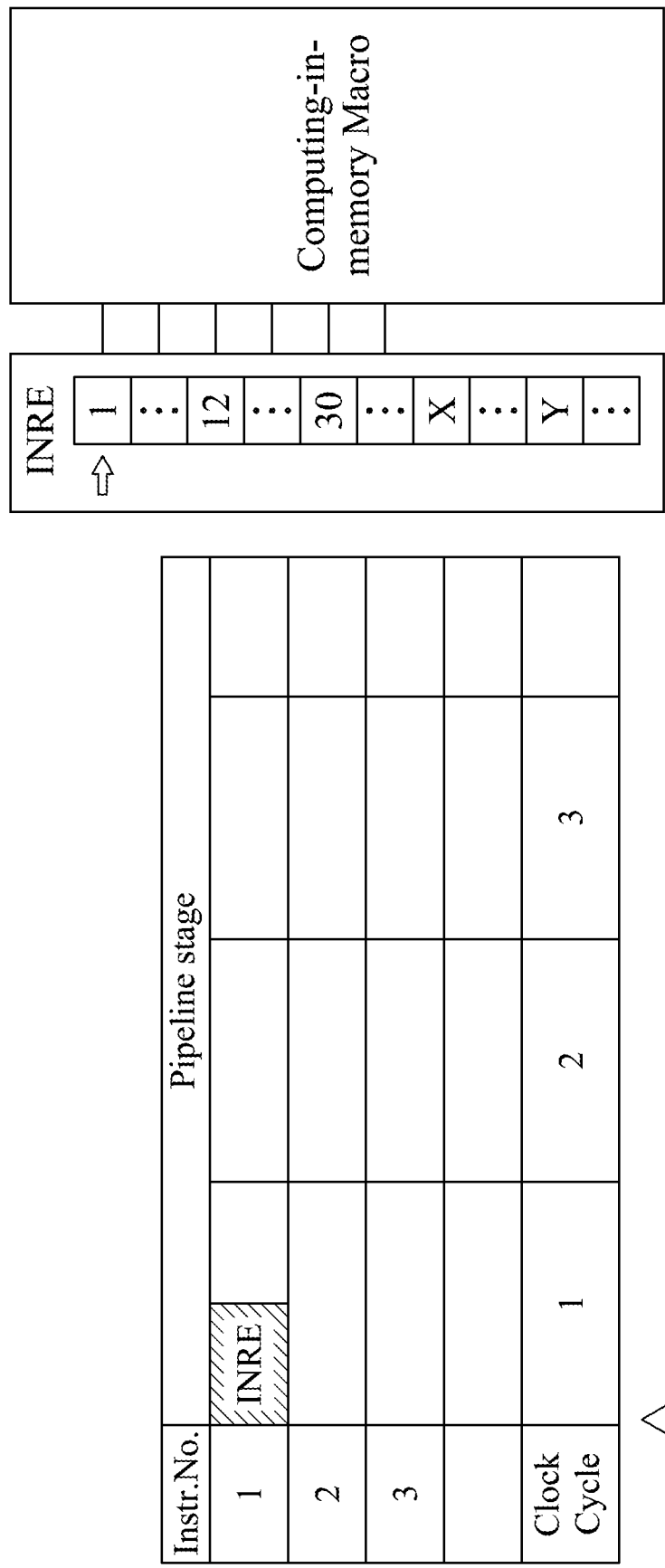
FIG. 16 shows a schematic view of a beginning of a first pipeline stage of a pipeline step of the input sequence re-ordering method of FIG. 15.
Figure 17:
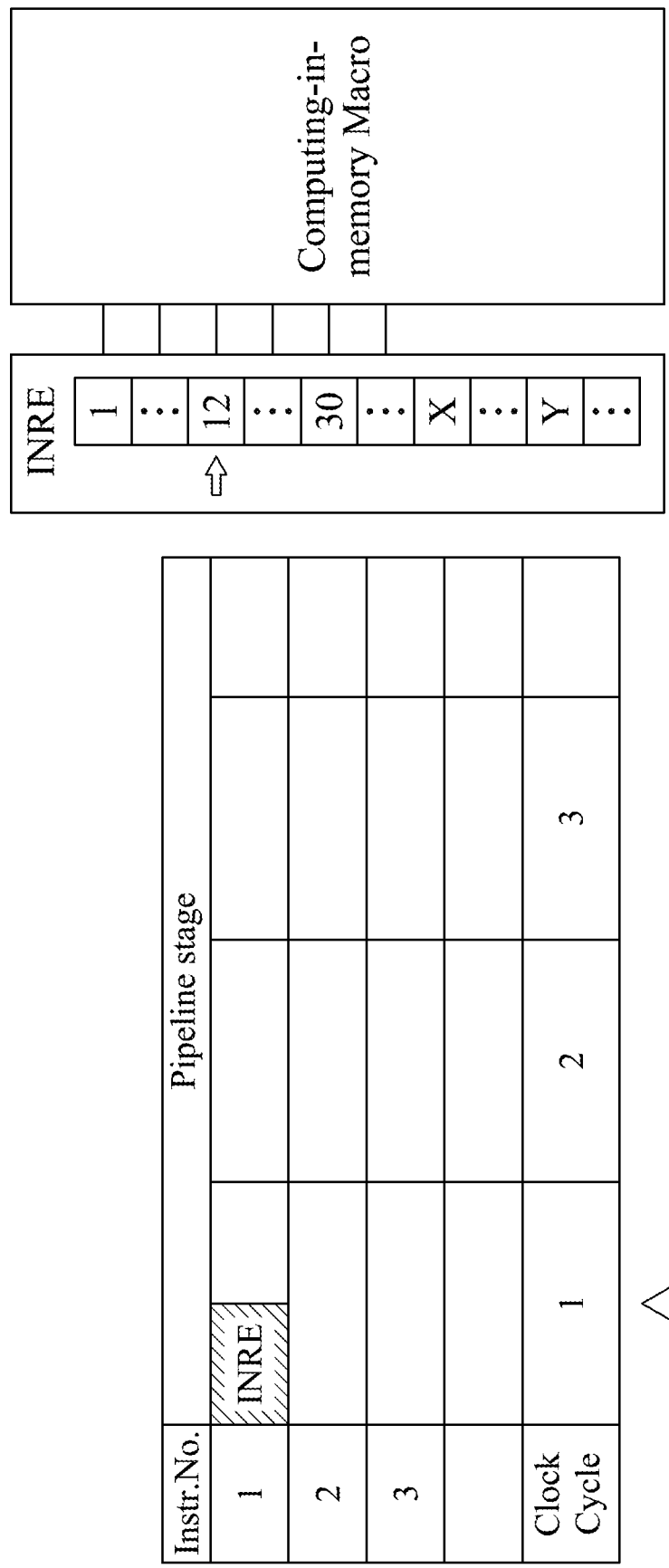
FIG. 17 shows a schematic view of an end of the first pipeline stage of the pipeline step of the input sequence re-ordering method of FIG. 15.
Figure 18:
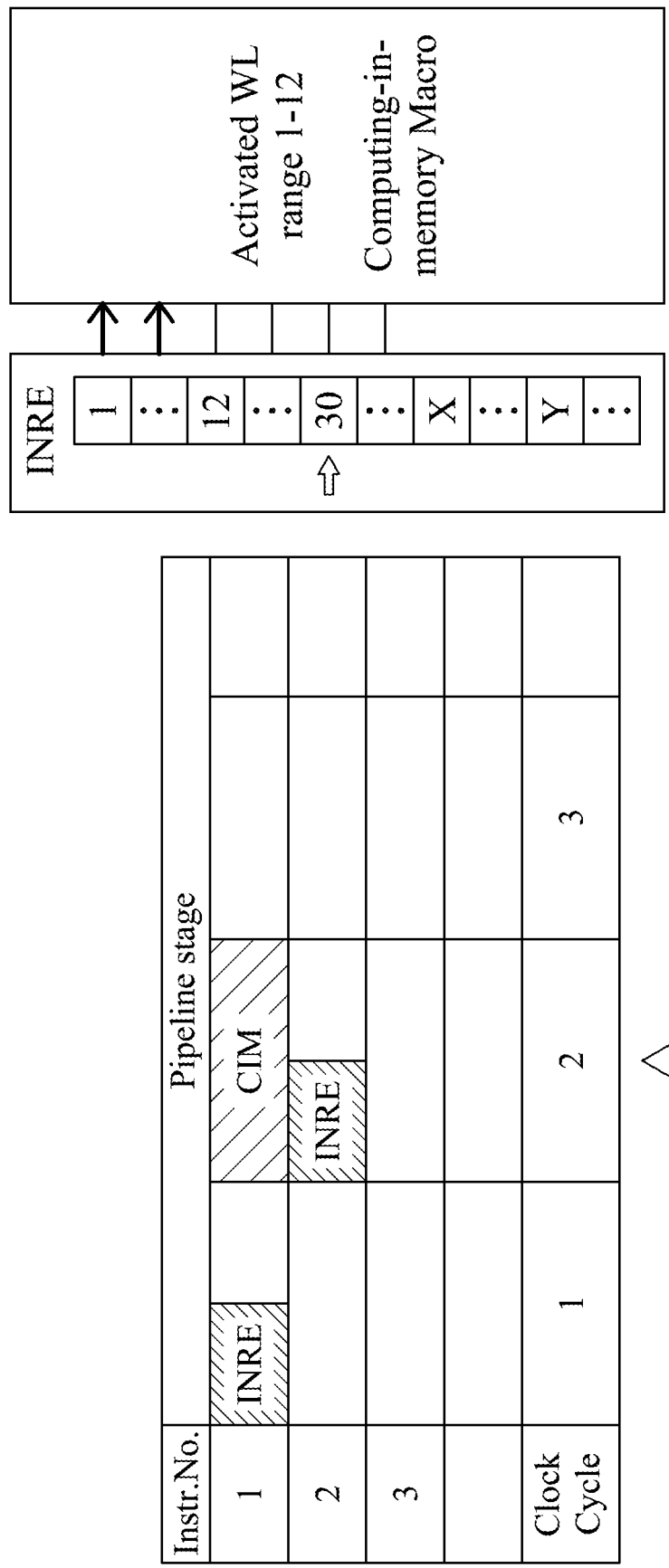
FIG. 18 shows a schematic view of an end of a second pipeline stage of the pipeline step of the input sequence re-ordering method of FIG. 15.
Figure 19:
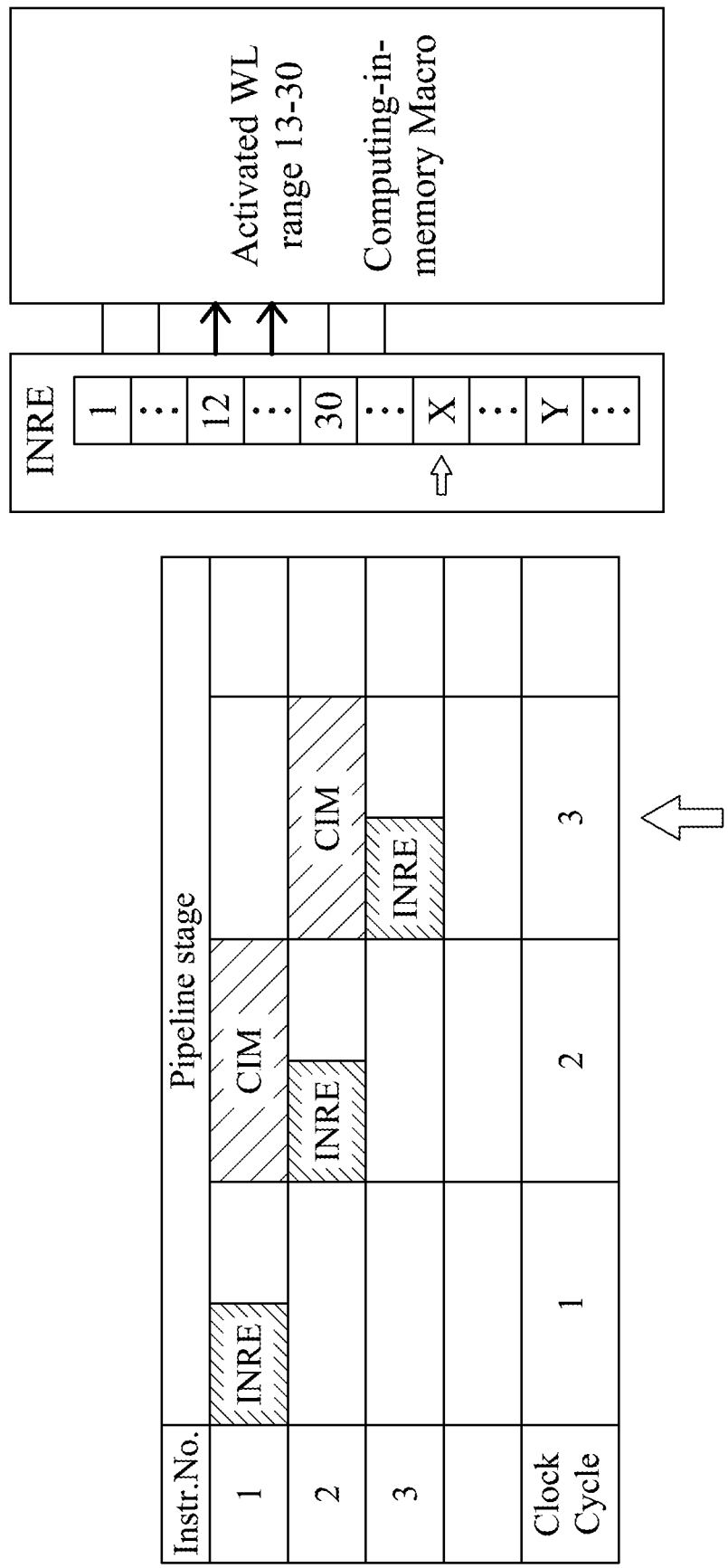
FIG. 19 shows a schematic view of an end of a third pipeline stage of the pipeline step of the input sequence re-ordering method of FIG. 15.
Figure 20:
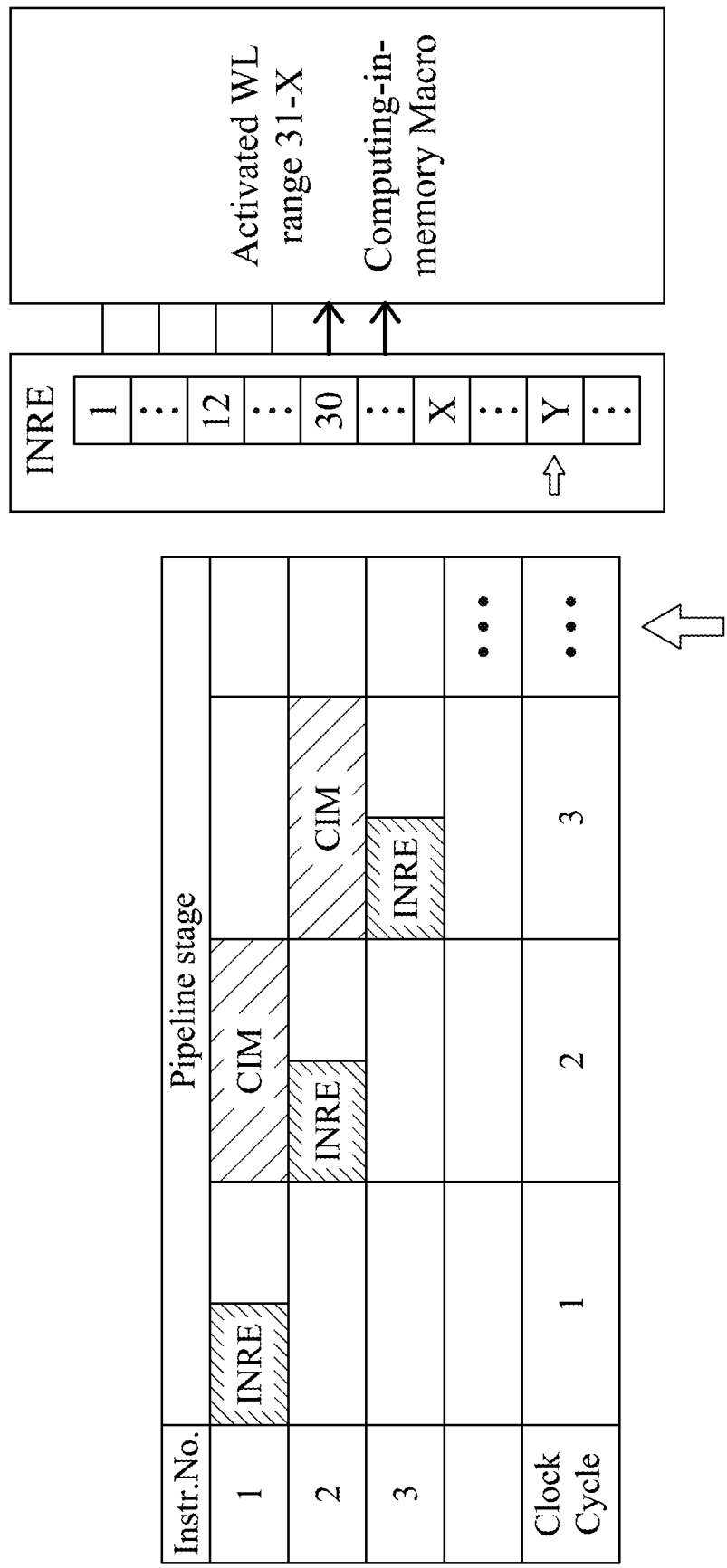
FIG. 20 shows a schematic view of an end of a fourth pipeline stage of the pipeline step of the input sequence re-ordering method of FIG. 15.

FIG. 15 shows a flow chart of an input sequence re-ordering method 100b with a multi input-precision reconfigurable scheme and a pipeline scheme for a CIM macro in a CNN application according to a third embodiment of the present disclosure. FIG. 16 shows a schematic view of a beginning ($IN_1$) of a first pipeline stage (INRE=$IN_1$-$IN_{12}$) of a pipeline step S28 of the input sequence re-ordering method 100b of FIG. 15. FIG. 17 shows a schematic view of an end ($IN_{12}$) of the first pipeline stage of the pipeline step S28 of the input sequence re-ordering method 100b of FIG. 15. FIG. 18 shows a schematic view of an end ($IN_{30}$) of a second pipeline stage (CIM Macro=$IN_1$-$IN_{12}$, INRE=$IN_{13}$-$IN_{30}$) of the pipeline step S28 of the input sequence re-ordering method 100b of FIG. 15. FIG. 19 shows a schematic view of an end ($IN_X$) of a third pipeline stage (CIM Macro=$IN_{13}$-$IN_{30}$, INRE=$IN_{31}$-$IN_X$) of the pipeline step S28 of the input sequence re-ordering method of FIG. 15. FIG. 20 shows a schematic view of an end ($IN_Y$) of a fourth pipeline stage (CIM Macro=$IN_{31}$-$IN_X$, INRE=$IN_{X+1}$-$IN_Y$) of the pipeline step S28 of the input sequence re-ordering method of FIG. 15. X and Y are positive values. X is greater than 31, and Y is greater than X+1. In FIGS. 2-20, the input sequence re-ordering method 100b with the multi input-precision reconfigurable scheme and the pipeline scheme for the CIM macro in the CNN application is configured to re-order a plurality of multi-bit input signals $IN_1$-$IN_{256}$ and includes performing an initializing step S22, a scanning step S34, a re-ordering step S26 and the pipeline step S28. The initializing step S22, the scanning step S24, the re-ordering step S26 and the pipeline step S28 are performed in sequence.

In FIG. 15, the detail of the initializing step S22, the scanning step S24 and the re-ordering step S26 is the same as the embodiments of the initializing step S12, the scanning step S14 and the re-ordering step S16 of FIG. 2, and will not be described again herein. In FIG. 15, the input sequence re-ordering method 100b further includes the pipeline step S28. The pipeline step S28 includes driving the CIM macro to perform a MAC calculation according to the one of the multi-bit section flags 200 and the part of the one group of the multi-bit input signals $IN_1$-$IN_{256}$, and driving the scanner to scan a next group (e.g., $IN_{13}$-$IN_{30}$) of the multi-bit input signals $IN_1$-$IN_{256}$, and the CIM macro and the scanner are driven by using the pipeline scheme. The pipeline scheme represents performing the MAC calculation in the CIM macro and scanning the next group of the multi-bit input signals $IN_1$-$IN_{256}$ in an input sequence re-ordering unit at the same time. In addition, the scanner does not label all of the multi-bit input signals $IN_1$-$IN_{256}$ at the beginning, but divides the labor with CIM in the pipeline scheme. When the CIM macro performs calculations, the scanner starts to scan and gathers the next group of the multi-bit input signals $IN_1$-$IN_{256}$ to be sent to the CIM macro. When there is one group of the multi-bit input signals $IN_1$-$IN_{256}$ ready to be sent to the CIM macro, the scanner stops operating to hide a scanning time period of the input sequence re-ordering unit into a CIM calculation time period of the CIM macro. For example, in FIG. 18, when the CIM macro performs calculations via a first instruction (i.e., "Instr. No."=1) at the beginning of a second clock cycle (i.e., "Clock Cycle"=2) in a pipeline stage, the scanner starts to scan and gathers the next group (e.g., $IN_{13}$-$IN_{30}$) of the multi-bit input signals $IN_1$-$IN_{256}$ to be sent to the CIM macro via a second instruction (i.e., "Instr. No."=2). When the next group (e.g., $IN_{13}$-$IN_{30}$) of the multi-bit input signals $IN_1$-$IN_{256}$ ready to be sent to the CIM macro, the scanner stops operating to hide the scanning time period of the input sequence re-ordering unit into the CIM calculation time period of the CIM macro. The scanning time period of the input sequence re-ordering unit is shorter than the CIM calculation time period of the CIM macro. Therefore, the input sequence re-ordering method 100b with the multi input-precision reconfigurable scheme and the pipeline scheme for the CIM macro in the CNN application of the present disclosure can re-group certain precision of the multi-bit input signals $IN_1$-$IN_{256}$ before feeding into the CIM macro, so that the part of the one group of the multi-bit input signals $IN_1$-$IN_{256}$ sent to the CIM macro can utilize the processing principle with the same bit to maximize utilization. In addition, the input sequence re-ordering method 100b of the present disclosure may use the scanner to preprocess the multi-bit input signals $IN_1$-$IN_{256}$ sent to the CIM macro to speed up the total time of the entire operation process and mainly solve the burden of the CIM macro in processing multi-bit operations.

Figure 21:
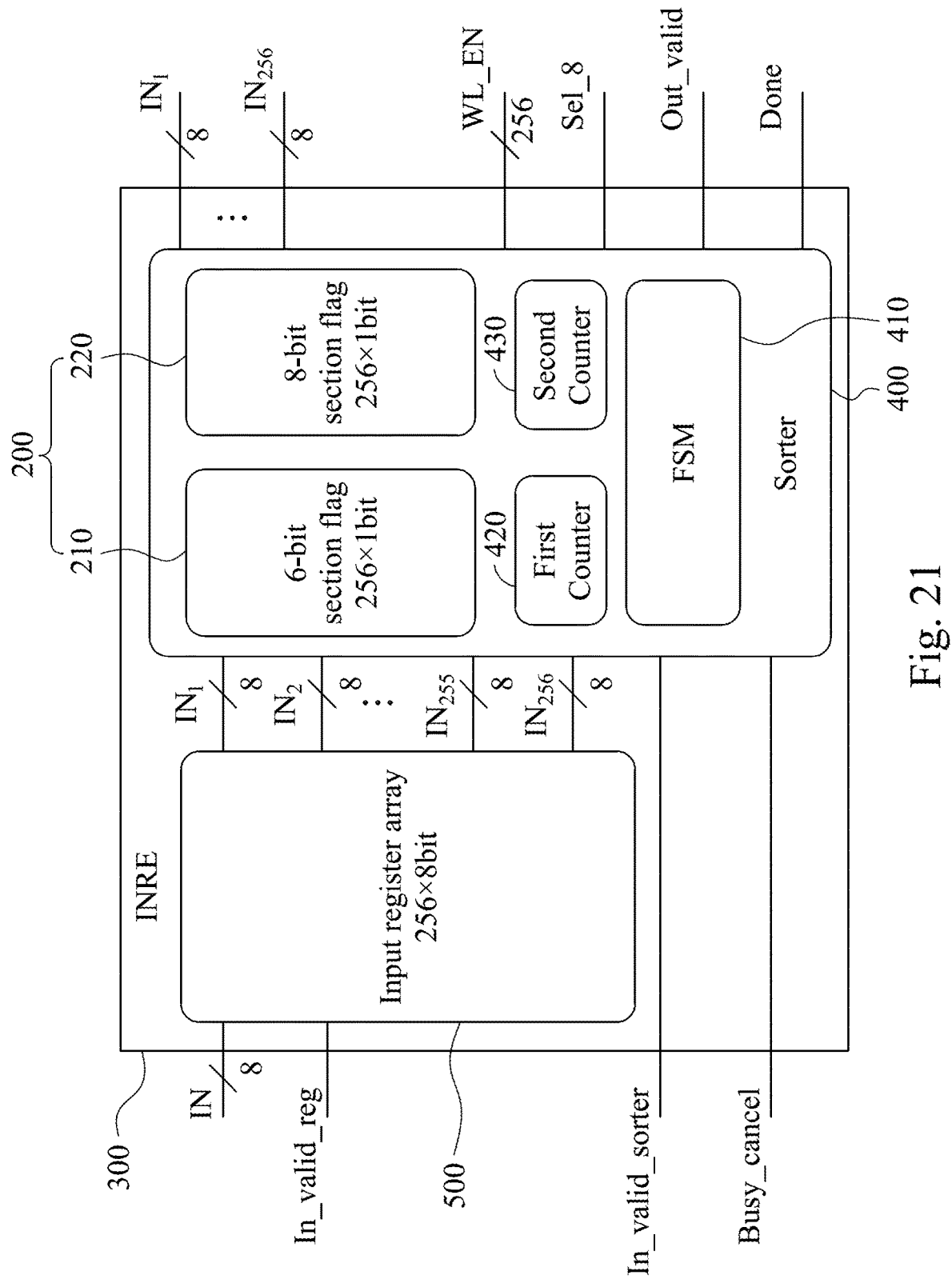
FIG. 21 shows a block diagram of an input sequence re-ordering unit with a multi input-precision reconfigurable scheme and a pipeline scheme for a CIM macro in a CNN application according to a fourth embodiment of the present disclosure.
Figure 22:
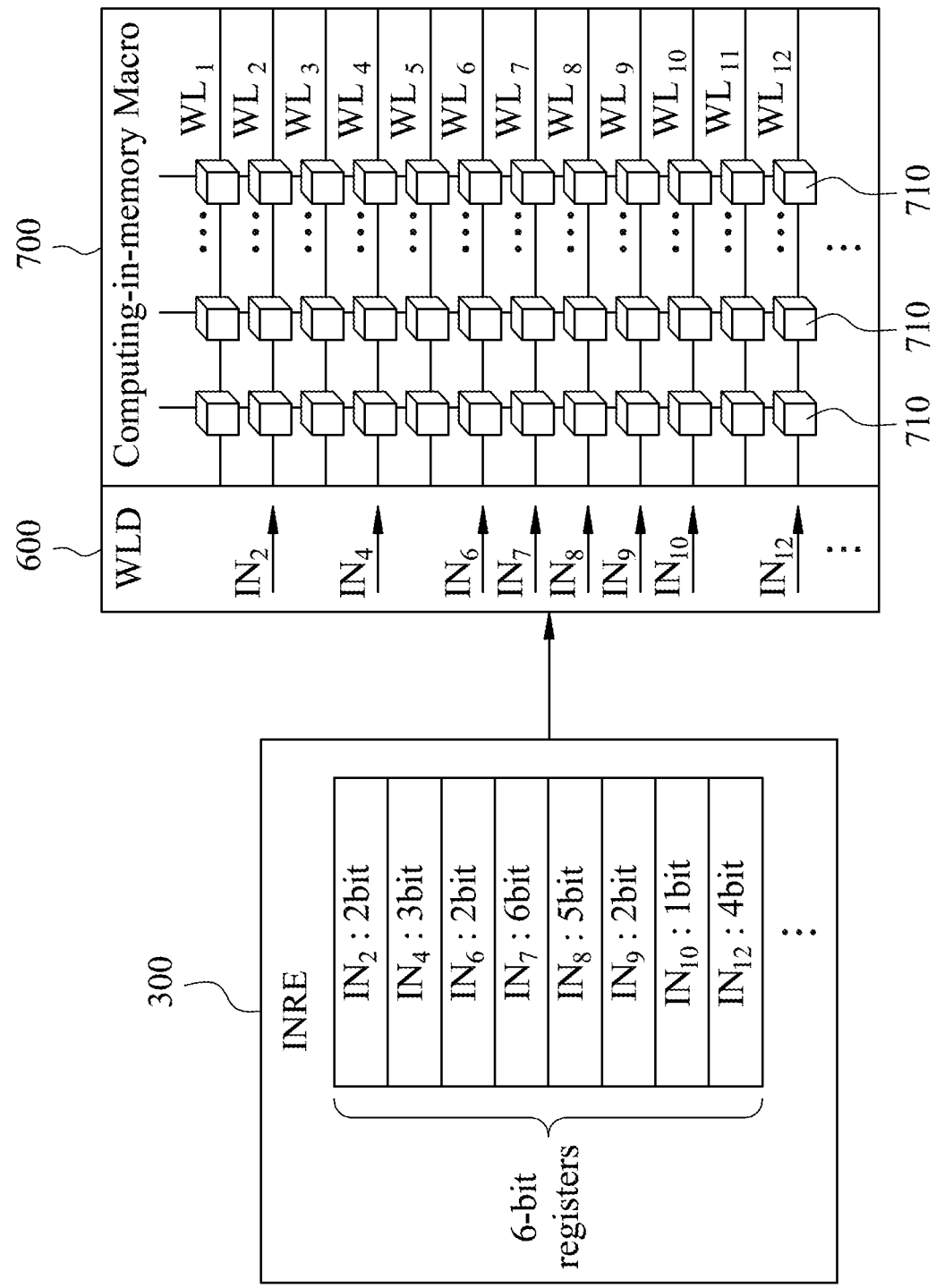
FIG. 22 shows a schematic view of the input sequence re-ordering unit, a word line driver and the CIM macro.
Figure 23:
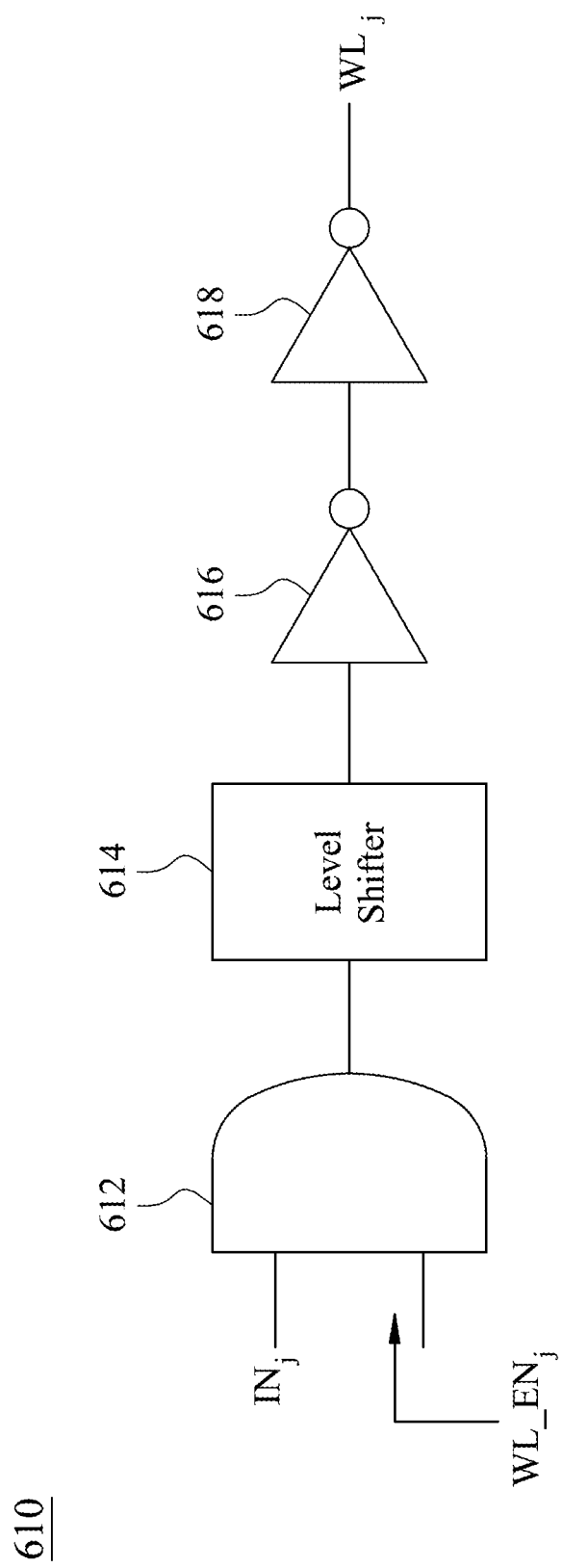
FIG. 23 shows a schematic view of one of a plurality of word line driving units of the word line driver of FIG. 22.

FIG. 21 shows a block diagram of an input sequence re-ordering unit 300 with a multi input-precision reconfigurable scheme and a pipeline scheme for a CIM macro 700 in a CNN application according to a fourth embodiment of the present disclosure. FIG. 22 shows a schematic view of the input sequence re-ordering unit 300, a word line driver 600 and the CIM macro 700. FIG. 23 shows a schematic view of one of a plurality of word line driving units 610 of the word line driver 600 of FIG. 22. In FIGS. 3-14 and 21-23, the input sequence re-ordering unit 300 with the multi input-precision reconfigurable scheme and the pipeline scheme for the CIM macro 700 in the CNN application is configured to re-order a plurality of multi-bit input signals $IN_1$-$IN_{256}$ and is represented by "INRE". The input sequence re-ordering unit 300 includes a sorter 400 and an input register array 500.

The sorter 400 is electrically connected to the CIM macro 700 via the word line driver 600. The sorter 400 includes a plurality of multi-bit section flags 200, a scanner 410, a first counter 420 and a second counter 430. The multi-bit section flags 200 include a plurality of flag signals and are electrically connected to the scanner 410. In FIG. 21, the detail of the multi-bit section flags 200 is the same as the embodiment of the multi-bit section flags 200 of FIGS. 3-14, and will not be described again herein. The scanner 410 can be implemented by a finite state machine and represented by "FSM". The scanner 410 is configured to scan the multi-bit input signals $IN_1$-$IN_{256}$ in sequence. The first counter 420 may generate a first count number Counter6, and the second counter 430 may generate a second count number Counter8. The scanner 410 is configured to scan one group of the multi-bit input signals $IN_1$-$IN_{256}$ to determine whether an initial value of one of the flag signals in one of the multi-bit section flags 200 is changed to an inverted initial value according to a plurality of bit numbers of the one group of the multi-bit input signals $IN_1$-$IN_{256}$, and the initial value is different from the inverted initial value. The scanner 410 is configured to select a part (e.g., $IN_2$, $IN_4$, $IN_6$-$IN_{10}$, $IN_{12}$) of the one group (e.g., $IN_1$-$IN_{12}$) of the multi-bit input signals $IN_1$-$IN_{256}$ corresponding to a plurality of the inverted initial values of the flag signals in the one of the multi-bit section flags 200, and transmit the part of the one group of the multi-bit input signals $IN_1$-$IN_{256}$ to the CIM macro 700.

The input register array 500 may be regarded as a buffer. The input register array 500 has 256×8 bit to access the multi-bit input signals $IN_1$-$IN_{256}$. The input register array 500 is electrically connected to the sorter 400. The input register array 500 is configured to arrange the multi-bit input signals in an array form.

The input sequence re-ordering unit 300 receives an input signal IN, a register valid signal In_valid_reg, a sorter valid signal In_valid_sorter and a CIM valid signal Busy_cancel. The input signal IN has eight bit and is written into the input register array 500. Each of the register valid signal In_valid_reg, the sorter valid signal In_valid_sorter and the CIM valid signal Busy_cancel has one bit and is transmitted to the input register array 500. The register valid signal In_valid_reg is configured to notify that the input signal IN is a valid signal. The sorter valid signal In_valid_sorter represents the start of scanning. The CIM valid signal Busy_cancel represents the end of calculation in the CIM macro 700. In addition, the input sequence re-ordering unit 300 outputs the multi-bit input signals $IN_1$-$IN_{256}$, a word line enable signal WL_EN, a bit selecting signal Sel_8, an output valid signal Out_valid and a finish signal Done. The word line enable signal WL_EN has 256 bits and is configured to select eight of the multi-bit input signals $IN_1$-$IN_{256}$ which have been labeled. Each bit of the word line enable signal WL_EN is corresponding to each of the multi-bit input signals $IN_1$-$IN_{256}$. Each of the bit selecting signal Sel_8, the output valid signal Out_valid and the finish signal Done has one bit. The bit selecting signal Sel_8 represents that the eight of the multi-bit input signals $IN_1$-$IN_{256}$ which have been labeled are represented by 8 bits or 6 bits, e.g., "1" for 8 bits, and "0" for 6 bits. The output valid signal Out_valid is configured to notify the CIM macro 700 that the eight of the multi-bit input signals $IN_1$-$IN_{256}$ which have been labeled can be used to perform a MAC calculation. The finish signal Done is configured to notify that all of the multi-bit input signals $IN_1$-$IN_{256}$ are calculated.

The word line driver 600 is represented by "WLD" and includes the word line driving units 610. Each of the word line driving units 610 is corresponding to a word line $WL_j$ and includes an AND gate 612, a level shifter 614, a first inverter 616 and a second inverter 168. The AND gate 612 is electrically connected between the input sequence re-ordering unit 300 and the level shifter 614. The AND gate 612 receives the multi-bit input signal $IN_j$ and one bit (i.e., $WL\_EN_j$) of the word line enable signal WL_EN. When the one bit (i.e., $WL\_EN_j$) of the word line enable signal WL_EN is equal to 1, the word line driving unit 610 transmits the multi-bit input signal $IN_j$ to the word line $WL_j$. When the one bit (i.e., $WL\_EN_j$) of the word line enable signal WL_EN is equal to 0, the word line $WL_j$ is maintained to 0. In one embodiment, j may be a positive value from 1 to 256. The level shifter 614 is configured to shift a voltage level generated by the AND gate 612. The first inverter 616 is electrically connected between the level shifter 614 and the second inverter 168.

The CIM macro 700 includes a plurality of memory cells 710. The memory cells 710 stores a plurality of weights and are controlled by the word lines $WL_j$ to generate a plurality of memory cell currents for the MAC calculation. When the part of the one group of the multi-bit input signals $IN_1$-$IN_{256}$ includes the multi-bit input signals $IN_2$, $IN_4$, $IN_6$-$IN_{10}$, $IN_{12}$, the word lines $WL_2$, $WL_4$, $WL_6$-$WL_{10}$, $WL_{12}$ transmit the multi-bit input signals $IN_2$, $IN_4$, $IN_6$-$IN_{10}$, $IN_{12}$, respectively, as shown in FIG. 22.

Therefore, the input sequence re-ordering unit 300 with the multi input-precision reconfigurable scheme and the pipeline scheme for the CIM macro 700 in the CNN application of the present disclosure can re-group certain precision of the multi-bit input signals $IN_1$-$IN_{256}$ before feeding into the CIM macro 700, so that the part of the one group of the multi-bit input signals $IN_1$-$IN_{256}$ sent to the CIM macro 700 can utilize the processing principle with the same bit to maximize utilization. In addition, the input sequence re-ordering unit 300 of the present disclosure may use the scanner 410 to preprocess the multi-bit input signals $IN_1$-$IN_{256}$ sent to the CIM macro 700 to speed up the total time of the entire operation process and mainly solve the burden of the CIM macro 700 in processing multi-bit operations.

Figure 24:
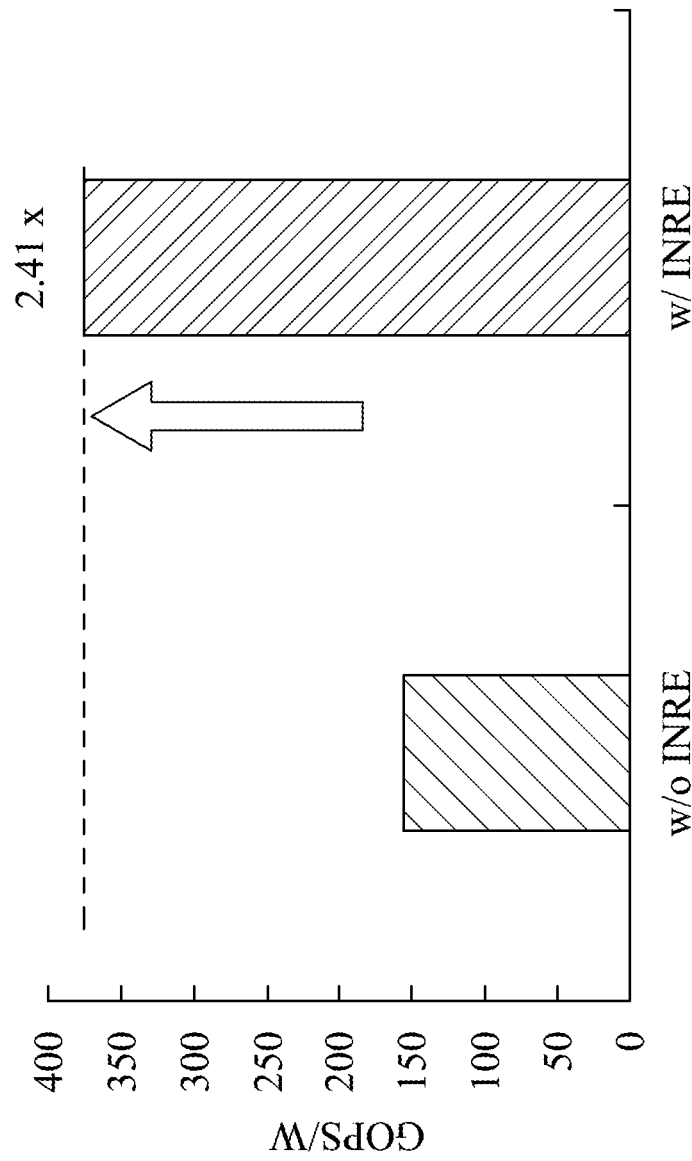
FIG. 24 shows a comparison result of throughput between the conventional method and the input sequence re-ordering method of the present disclosure.

FIG. 24 shows a comparison result of throughput between the conventional method (i.e., without input re-ordering (w/o INRE)) and the input sequence re-ordering method 100b (i.e., with input re-ordering (w/ INRE)) of the present disclosure. The input sequence re-ordering method 100b of the present disclosure can improve the throughput (giga operations per second per watt (GOPS/W)) of the CIM macro 700 by 2.41× compared to the conventional method.

According to the aforementioned embodiments and examples, the advantages of the present disclosure are described as follows.

1. The input sequence re-ordering method and the input sequence re-ordering unit with the multi input-precision reconfigurable scheme and the pipeline scheme for the CIM macro in the CNN application of the present disclosure can re-group certain precision of the multi-bit input signals before feeding into the CIM macro, so that the part of the one group of the multi-bit input signals sent to the CIM macro can utilize the processing principle with the same bit to maximize utilization.

2. The input sequence re-ordering method and the input sequence re-ordering unit with the multi input-precision reconfigurable scheme and the pipeline scheme for the CIM macro in the CNN application of the present disclosure can use the scanner to preprocess the multi-bit input signals sent to the CIM macro to speed up the total time of the entire operation process and mainly solve the burden of the CIM macro in processing multi-bit operations.

3. The input sequence re-ordering method of the present disclosure can improve the throughput of the CIM macro by 2.41× compared to the conventional method.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An input sequence re-ordering method with a multi input-precision reconfigurable scheme and a pipeline scheme for a computing-in-memory macro in a convolutional neural network application, which is configured to re-order a plurality of multi-bit input signals, and the input sequence re-ordering method with the multi input-precision reconfigurable scheme and the pipeline scheme for the computing-in-memory macro in the convolutional neural network application comprising:

performing a scanning step, wherein the scanning step comprises driving a scanner to scan one group of the plurality of multi-bit input signals to determine whether an initial value of one of a plurality of flag signals in one of a plurality of multi-bit section flags is changed to an inverted initial value according to a plurality of bit numbers of the one group of the plurality of multi-bit input signals, and the initial value is different from the inverted initial value; and performing a re-ordering step, wherein the re-ordering step comprises driving a sorter to select a part of the one group of the plurality of multi-bit input signals corresponding to a plurality of inverted initial values of the plurality of flag signals in the one of the plurality of multi-bit section flags, and then transmit the part of the one group of the plurality of multi-bit input signals to the computing-in-memory macro;

wherein the plurality of multi-bit section flags comprise:

a first multi-bit section flag configured to label at least one N-bit input signal of the plurality of multi-bit input signals, wherein the first multi-bit section flag comprises a plurality of first flag signals, a number of the plurality of first flag signals is equal to a number of the plurality of multi-bit input signals, the plurality of first flag signals are corresponding to the plurality of multi-bit input signals, respectively, the at least one N-bit input signal is represented by an N bit value, and N is a positive integer; and a second multi-bit section flag configured to label at least one M-bit input signal of the plurality of multi-bit input signals, wherein the second multi-bit section flag comprises a plurality of second flag signals, a number of the plurality of second flag signals is equal to the number of the plurality of multi-bit input signals, the plurality of second flag signals are corresponding to the plurality of multi-bit input signals, respectively, the at least one M-bit input signal is represented by an M bit value, and M is a positive integer greater than N;

wherein the scanning step further comprises:

performing a first scanning sub-step, wherein the first scanning sub-step comprises driving the scanner to scan the one group of the plurality of multi-bit input signals to obtain the plurality of bit numbers of the one group of the plurality of multi-bit input signals; and performing a second scanning sub-step, wherein the second scanning sub-step comprises driving the sorter to determine whether the initial value of one of the plurality of first flag signals of the first multi-bit section flag and the plurality of second flag signals of the second multi-bit section flag is changed to the inverted initial value according to one of the plurality of bit numbers of the one group of the plurality of multi-bit input signals;

wherein in the second scanning sub-step, in response to determining that the one of the plurality of bit numbers of the one group of the plurality of multi-bit input signals is equal to N, the initial value of one of the plurality of first flag signals of the first multi-bit section flag is changed to the inverted initial value, the initial value of one of the plurality of second flag signals of the second multi-bit section flag is not changed, and a first count number of a first counter of the sorter is added by 1;

wherein the first count number represents a number of a plurality of the plurality of first flag signals which are all equal to the inverted initial value in the first multi-bit section flag.

2. The input sequence re-ordering method with the multi input-precision reconfigurable scheme and the pipeline scheme for the computing-in-memory macro in the convolutional neural network application of claim 1, further comprising:

performing an initializing step, wherein the initializing step comprises driving the sorter to initialize each of the plurality of flag signals in each of the plurality of multi-bit section flags to the initial value, and a number of the plurality of flag signals is equal to the number of the plurality of multi-bit input signals;

wherein the initializing step, the scanning step and the re-ordering step are performed in sequence.

3. The input sequence re-ordering method with the multi input-precision reconfigurable scheme and the pipeline scheme for the computing-in-memory macro in the convolutional neural network application of claim 1, wherein the initial value is equal to 0, the inverted initial value is equal to 1, the plurality of multi-bit input signals comprise a first input sub-group, a second input sub-group and a third input sub-group, and the first input sub-group and the second input sub-group have six bits and eight bits, respectively.

4. The input sequence re-ordering method with the multi input-precision reconfigurable scheme and the pipeline scheme for the computing-in-memory macro in the convolutional neural network application of claim 1, wherein in the second scanning sub-step, in response to determining that the one of the plurality of bit numbers of the one group of the plurality of multi-bit input signals is equal to M, the initial value of the one of the plurality of first flag signals of the first multi-bit section flag is not changed, the initial value of the one of the plurality of second flag signals of the second multi-bit section flag is changed to the inverted initial value, and a second count number of a second counter of the sorter is added by 1;

wherein the second count number represents a number of a plurality of the plurality of second flag signals which are all equal to the inverted initial value in the second multi-bit section flag.

5. The input sequence re-ordering method with the multi input-precision reconfigurable scheme and the pipeline scheme for the computing-in-memory macro in the convolutional neural network application of claim 4, wherein the re-ordering step further comprises:

in response to determining that the first count number reaches a predetermined count number, setting the part of the one group of the plurality of multi-bit input signals to a plurality of the plurality of multi-bit input signals corresponding to the plurality of first flag signals which are all equal to the inverted initial value; and in response to determining that the second count number reaches the predetermined count number, setting the part of the one group of the plurality of multi-bit input signals to a plurality of the plurality of multi-bit input signals corresponding to the plurality of second flag signals which are all equal to the inverted initial value.

6. An input sequence re-ordering method with a multi input-precision reconfigurable scheme and a pipeline scheme for a computing-in-memory macro in a convolutional neural network application, which is configured to re-order a plurality of multi-bit input signals, and the input sequence re-ordering method with the multi input-precision reconfigurable scheme and the pipeline scheme for the computing-in-memory macro in the convolutional neural network application comprising:

performing a scanning step, wherein the scanning step comprises driving a scanner to scan one group of the plurality of multi-bit input signals to determine whether an initial value of one of a plurality of flag signals in one of a plurality of multi-bit section flags is changed to an inverted initial value according to a plurality of bit numbers of the one group of the plurality of multi-bit input signals, and the initial value is different from the inverted initial value;

performing a re-ordering step, wherein the re-ordering step comprises driving a sorter to select a part of the one group of the plurality of multi-bit input signals corresponding to a plurality of inverted initial values of the plurality of flag signals in the one of the plurality of multi-bit section flags, and then transmit the part of the one group of the plurality of multi-bit input signals to the computing-in-memory macro; and performing a pipeline step, wherein the pipeline step comprises driving the computing-in-memory macro to perform a multiply-and-accumulate calculation according to the one of the plurality of multi-bit section flags and the part of the one group of the plurality of multi-bit input signals, and driving the scanner to scan a next group of the plurality of multi-bit input signals, and the computing-in-memory macro and the scanner are driven by using the pipeline scheme;

wherein the plurality of multi-bit section flags comprise:
a first multi-bit section flag configured to label at least one N-bit input signal of the plurality of multi-bit input signals, wherein the first multi-bit section flag comprises a plurality of first flag signals, a number of the plurality of first flag signals is equal to a number of the plurality of multi-bit input signals, the plurality of first flag signals are corresponding to the plurality of multi-bit input signals, respectively, the at least one N-bit input signal is represented by an N bit value, and N is a positive integer; and a second multi-bit section flag configured to label at least one M-bit input signal of the plurality of multi-bit input signals, wherein the second multi-bit section flag comprises a plurality of second flag signals, a number of the plurality of second flag signals is equal to the number of the plurality of multi-bit input signals, the plurality of second flag signals are corresponding to the plurality of multi-bit input signals, respectively, the at least one M-bit input signal is represented by an M bit value, and M is a positive integer greater than N;

wherein the scanning step further comprises:
performing a first scanning sub-step, wherein the first scanning sub-step comprises driving the scanner to scan the one group of the plurality of multi-bit input signals to obtain the plurality of bit numbers of the one group of the plurality of multi-bit input signals; and performing a second scanning sub-step, wherein the second scanning sub-step comprises driving the sorter to determine whether the initial value of one of the plurality of first flag signals of the first multi-bit section flag and the plurality of second flag signals of the second multi-bit section flag is changed to the inverted initial value according to one of the plurality of bit numbers of the one group of the plurality of multi-bit input signals;

wherein in the second scanning sub-step, in response to determining that the one of the plurality of bit numbers of the one group of the plurality of multi-bit input signals is equal to N, the initial value of one of the plurality of first flag signals of the first multi-bit section flag is changed to the inverted initial value, the initial value of one of the plurality of second flag signals of the second multi-bit section flag is not changed, and a first count number of a first counter of the sorter is added by 1;

wherein the first count number represents a number of a plurality of the plurality of first flag signals which are all equal to the inverted initial value in the first multi-bit section flag.

7. The input sequence re-ordering method with the multi input-precision reconfigurable scheme and the pipeline scheme for the computing-in-memory macro in the convolutional neural network application of claim 6, further comprising:

performing an initializing step, wherein the initializing step comprises driving the sorter to initialize each of the plurality of flag signals in each of the plurality of multi-bit section flags to the initial value, and a number of the plurality of flag signals is equal to the number of the plurality of multi-bit input signals;

wherein the initializing step, the scanning step, the re-ordering step and the pipeline step are performed in sequence.

8. The input sequence re-ordering method with the multi input-precision reconfigurable scheme and the pipeline scheme for the computing-in-memory macro in the convolutional neural network application of claim 6, wherein the initial value is equal to 0, the inverted initial value is equal to 1, the plurality of multi-bit input signals comprise a first input sub-group, a second input sub-group and a third input sub-group, and the first input sub-group and the second input sub-group have six bits and eight bits, respectively.

9. The input sequence re-ordering method with the multi input-precision reconfigurable scheme and the pipeline scheme for the computing-in-memory macro in the convolutional neural network application of claim 6, wherein in the second scanning sub-step, in response to determining that the one of the plurality of bit numbers of the one group of the plurality of multi-bit input signals is equal to M, the initial value of the one of the plurality of first flag signals of the first multi-bit section flag is not changed, the initial value of the one of the plurality of second flag signals of the second multi-bit section flag is changed to the inverted initial value, and a second count number of a second counter of the sorter is added by 1;

wherein the second count number represents a number of a plurality of the plurality of second flag signals which are all equal to the inverted initial value in the second multi-bit section flag.

10. The input sequence re-ordering method with the multi input-precision reconfigurable scheme and the pipeline scheme for the computing-in-memory macro in the convolutional neural network application of claim 9, wherein the re-ordering step further comprises:

in response to determining that the first count number reaches a predetermined count number, setting the part of the one group of the plurality of multi-bit input signals to a plurality of the plurality of multi-bit input signals corresponding to the plurality of first flag signals which are all equal to the inverted initial value; and in response to determining that the second count number reaches the predetermined count number, setting the part of the one group of the plurality of multi-bit input signals to a plurality of the plurality of multi-bit input signals corresponding to the plurality of second flag signals which are all equal to the inverted initial value.

11. An input sequence re-ordering unit with a multi input-precision reconfigurable scheme and a pipeline scheme for a computing-in-memory macro in a convolutional neural network application, which is configured to re-order a plurality of multi-bit input signals, and the input sequence re-ordering unit with the multi input-precision reconfigurable scheme and the pipeline scheme for the computing-in-memory macro in the convolutional neural network application comprising:

a sorter electrically connected to the computing-in-memory macro and comprising:
 a plurality of multi-bit section flags comprising a plurality of flag signals; and
 a scanner electrically connected to the plurality of multi-bit section flags, wherein the scanner is configured to scan one group of the plurality of multi-bit input signals to determine whether an initial value of one of the plurality of flag signals in one of the plurality of multi-bit section flags is changed to an inverted initial value according to a plurality of bit numbers of the one group of the plurality of multi-bit input signals, and the initial value is different from the inverted initial value;
wherein the sorter is configured to select a part of the one group of the plurality of multi-bit input signals corresponding to a plurality of inverted initial values of the plurality of flag signals in the one of the plurality of multi-bit section flags, and transmit the part of the one group of the plurality of multi-bit input signals to the computing-in-memory macro;
wherein the plurality of multi-bit section flags further comprise:
 a first multi-bit section flag configured to label at least one N-bit input signal of the plurality of multi-bit input signals, wherein the first multi-bit section flag comprises a plurality of first flag signals, a number of the plurality of first flag signals is equal to a number of the plurality of multi-bit input signals, the plurality of first flag signals are corresponding to the plurality of multi-bit input signals, respectively, the at least one N-bit input signal is represented by an N bit value, and N is a positive integer; and
 a second multi-bit section flag configured to label at least one M-bit input signal of the plurality of multi-bit input signals, wherein the second multi-bit section flag comprises a plurality of second flag signals, a number of the plurality of second flag signals is equal to the number of the plurality of multi-bit input signals, the plurality of second flag signals are corresponding to the plurality of multi-bit input signals, respectively, the at least one M-bit input signal is represented by an M bit value, and M is a positive integer greater than N;
wherein the scanner is configured to scan the one group of the plurality of multi-bit input signals to obtain the plurality of bit numbers of the one group of the plurality of multi-bit input signals;

wherein the sorter is configured to determine whether the initial value of one of the plurality of first flag signals of the first multi-bit section flag and the plurality of second flag signals of the second multi-bit section flag is changed to the inverted initial value according to one of the plurality of bit numbers of the one group of the plurality of multi-bit input signals;

wherein in the sorter, in response to determining that the one of the plurality of bit numbers of the one group of the plurality of multi-bit input signals is equal to N, the initial value of one of the plurality of first flag signals of the first multi-bit section flag is changed to the inverted initial value, the initial value of one of the plurality of second flag signals of the second multi-bit section flag is not changed, and a first count number of a first counter of the sorter is added by 1;

wherein the first count number represents a number of a plurality of the plurality of first flag signals which are all equal to the inverted initial value in the first multi-bit section flag.

12. The input sequence re-ordering unit with the multi input-precision reconfigurable scheme and the pipeline scheme for the computing-in-memory macro in the convolutional neural network application of claim 11, further comprising:

an input register array electrically connected to the sorter, wherein the input register array is configured to arrange the plurality of multi-bit input signals in an array form;

wherein the scanner is configured to scan the plurality of multi-bit input signals in sequence.

13. The input sequence re-ordering unit with the multi input-precision reconfigurable scheme and the pipeline scheme for the computing-in-memory macro in the convolutional neural network application of claim 11, wherein in the sorter, in response to determining that the one of the plurality of bit numbers of the one group of the plurality of multi-bit input signals is equal to M, the initial value of the one of the plurality of first flag signals of the first multi-bit section flag is not changed, the initial value of the one of the plurality of second flag signals of the second multi-bit section flag is changed to the inverted initial value, and a second count number of a second counter of the sorter is added by 1;

wherein the second count number represents a number of a plurality of the plurality of second flag signals which are all equal to the inverted initial value in the second multi-bit section flag.

14. The input sequence re-ordering unit with the multi input-precision reconfigurable scheme and the pipeline scheme for the computing-in-memory macro in the convolutional neural network application of claim 13, wherein in the sorter, in response to determining that the first count number reaches a predetermined count number, the part of the one group of the plurality of multi-bit input signals is set to a plurality of the plurality of multi-bit input signals corresponding to the plurality of first flag signals which are all equal to the inverted initial value; and in response to determining that the second count number reaches the predetermined count number, the part of the one group of the plurality of multi-bit input signals is set to a plurality of the plurality of multi-bit input signals corresponding to the plurality of second flag signals which are all equal to the inverted initial value.

* * * * *